United States Patent
Grundmann et al.

(10) Patent No.: US 10,243,415 B1
(45) Date of Patent: Mar. 26, 2019

(54) MOBILE POWER TRANSMITTER

(71) Applicant: X Development LLC, Mountain View, CA (US)

(72) Inventors: Michael Grundmann, San Jose, CA (US); Brian Adolf, Mountain View, CA (US); Eric Liu, Redwood City, CA (US); Mathias Fleck, Mountain View, CA (US); Maaike Evers, San Francisco, CA (US); Matt Swinton, San Francisco, CA (US); Michael Simonian, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 176 days.

(21) Appl. No.: 15/393,955

(22) Filed: Dec. 29, 2016

(51) Int. Cl.
| | |
|---|---|
| *B60L 11/18* | (2006.01) |
| *H02J 50/12* | (2016.01) |
| *H02J 50/50* | (2016.01) |
| *H02J 50/80* | (2016.01) |
| *H02J 50/90* | (2016.01) |

(52) U.S. Cl.
CPC ............ *H02J 50/90* (2016.02); *B60L 11/182* (2013.01); *H02J 50/12* (2016.02); *H02J 50/50* (2016.02); *H02J 50/80* (2016.02)

(58) Field of Classification Search
CPC ............ H02J 7/025; H02J 17/00; H02J 5/005
See application file for complete search history.

(56) References Cited

U.S. PATENT DOCUMENTS

| | | | |
|---|---|---|---|
| 5,301,096 A | * | 4/1994 | Klontz .................... H01F 38/14 363/37 |
| 6,087,806 A | * | 7/2000 | Fujioka ............... B60L 11/1816 320/109 |
| 6,980,000 B2 | | 12/2005 | Wong et al. |
| 8,143,746 B2 | | 3/2012 | Marzetta et al. |
| 8,421,408 B2 | | 4/2013 | Hamedi-Hagh et al. |
| 8,461,719 B2 | | 6/2013 | Kesler et al. |

(Continued)

FOREIGN PATENT DOCUMENTS

WO      15/119458 A1      8/2015

OTHER PUBLICATIONS

Mathew et al., "Multi-robot Rendezvous Planning for Recharging in Persistent Tasks", IEEE, Jan. 2013, 14 pages, DOI: 10.1109/TRO.2014.2380593.

(Continued)

*Primary Examiner* — David V Henze-Gongola
(74) *Attorney, Agent, or Firm* — McDonnell Boehnen Hulbert & Berghoff LLP

(57) ABSTRACT

Disclosed herein are systems and methods for providing wireless power. The method includes determining a route in an area for a charger vehicle, where the charger vehicle includes a primary wireless power transceiver. The method further includes determining a schedule according to which the charger vehicle travels along the route. The method also includes determining a number of repeater vehicles to deploy in the area to extend a range of the primary transceiver of the charger vehicle. Further, the method includes deploying the determined number of repeater vehicles into the area. Furthermore, the method includes coupling each of the repeater vehicles to the charger vehicle via a respective first wireless resonant coupling link.

18 Claims, 20 Drawing Sheets

(56) References Cited

U.S. PATENT DOCUMENTS

| | | | |
|---|---|---|---|
| 8,473,135 B2* | 6/2013 | Sekijima | G01C 21/3469 |
| | | | 701/22 |
| 8,513,915 B2 | 8/2013 | Patel | |
| 8,712,481 B2* | 4/2014 | Shionoiri | B60L 8/003 |
| | | | 455/572 |
| 8,754,548 B2 | 6/2014 | Hong et al. | |
| 8,772,960 B2 | 7/2014 | Yoshida | |
| 8,824,588 B2 | 9/2014 | Emmanuel et al. | |
| 8,854,176 B2 | 10/2014 | Zeine | |
| 9,106,203 B2 | 8/2015 | Kesler et al. | |
| 9,124,122 B2 | 9/2015 | Kim et al. | |
| 9,153,847 B2 | 10/2015 | Harty | |
| 9,566,868 B2* | 2/2017 | Jammer | B60L 11/1816 |
| 10,011,181 B2* | 7/2018 | Dudar | B60L 11/182 |
| 2008/0266007 A1 | 10/2008 | Tsai | |
| 2010/0259108 A1 | 10/2010 | Giler | |
| 2011/0025267 A1* | 2/2011 | Kamen | B60L 8/003 |
| | | | 320/109 |
| 2011/0238519 A1* | 9/2011 | Basak | G06Q 30/06 |
| | | | 705/26.3 |
| 2011/0254377 A1 | 10/2011 | Wildmer et al. | |
| 2012/0086284 A1 | 4/2012 | Capanella et al. | |
| 2012/0153739 A1 | 6/2012 | Cooper et al. | |
| 2012/0222997 A1 | 9/2012 | Potucek et al. | |
| 2012/0299373 A1* | 11/2012 | Yoshida | H02J 50/12 |
| | | | 307/9.1 |
| 2013/0043738 A1* | 2/2013 | Park | H04M 1/7253 |
| | | | 307/104 |
| 2013/0049456 A1 | 2/2013 | Kim | |
| 2013/0049475 A1 | 2/2013 | Kim et al. | |
| 2013/0132317 A1 | 5/2013 | Hinchey et al. | |
| 2013/0142230 A1 | 6/2013 | Chintala | |
| 2013/0226637 A1* | 8/2013 | Bozchalui | G06Q 10/06 |
| | | | 705/7.12 |
| 2014/0080409 A1 | 3/2014 | Frankland et al. | |
| 2014/0088804 A1* | 3/2014 | Hyde | H02J 7/0054 |
| | | | 701/22 |
| 2014/0089064 A1* | 3/2014 | Hyde | G06Q 30/0611 |
| | | | 705/14.4 |
| 2014/0111151 A1 | 4/2014 | Keeling et al. | |
| 2014/0217967 A1 | 8/2014 | Zeine et al. | |
| 2014/0232331 A1 | 8/2014 | Stamenic et al. | |
| 2014/0273835 A1 | 9/2014 | Ghovanloo et al. | |
| 2014/0287681 A1 | 9/2014 | Ollikainen et al. | |
| 2014/0306654 A1 | 10/2014 | Partovi | |
| 2014/0361628 A1 | 12/2014 | Huang et al. | |
| 2014/0371931 A1 | 12/2014 | Lin et al. | |
| 2014/0375256 A1 | 12/2014 | Lee | |
| 2015/0051750 A1 | 2/2015 | Kurs et al. | |
| 2015/0077037 A1 | 3/2015 | Leabman et al. | |
| 2015/0091706 A1 | 4/2015 | Chemishkian et al. | |
| 2015/0123402 A1 | 5/2015 | Wagoner et al. | |
| 2015/0123456 A1 | 5/2015 | Leabman et al. | |
| 2015/0148955 A1 | 5/2015 | Chin et al. | |
| 2015/0266391 A1 | 9/2015 | Hostyn et al. | |
| 2015/0333540 A1* | 11/2015 | Niizuma | H02J 17/00 |
| | | | 114/312 |
| 2016/0023557 A1 | 1/2016 | Dimke | |
| 2016/0052415 A1 | 2/2016 | Bell | |
| 2016/0129793 A1* | 5/2016 | Cronie | B60L 11/182 |
| | | | 320/109 |
| 2016/0185241 A1* | 6/2016 | Kinomura | B60L 3/00 |
| | | | 307/10.1 |
| 2016/0303986 A1* | 10/2016 | Park | B60L 11/18 |
| 2017/0136881 A1* | 5/2017 | Ricci | B60L 5/005 |
| 2017/0317529 A1 | 11/2017 | Smith | |

OTHER PUBLICATIONS

Griffin et al. "Resonant Wireless Power Transfer to Ground Sensors from a UAV," IEEE, May 2012, 6 pages, DOI: 10.1109/ICRA.2012.6225205.

Notice of Allowance dated Sep. 5, 2017 of U.S. Appl. No. 14/940,762, filed Nov. 13, 2015.

* cited by examiner

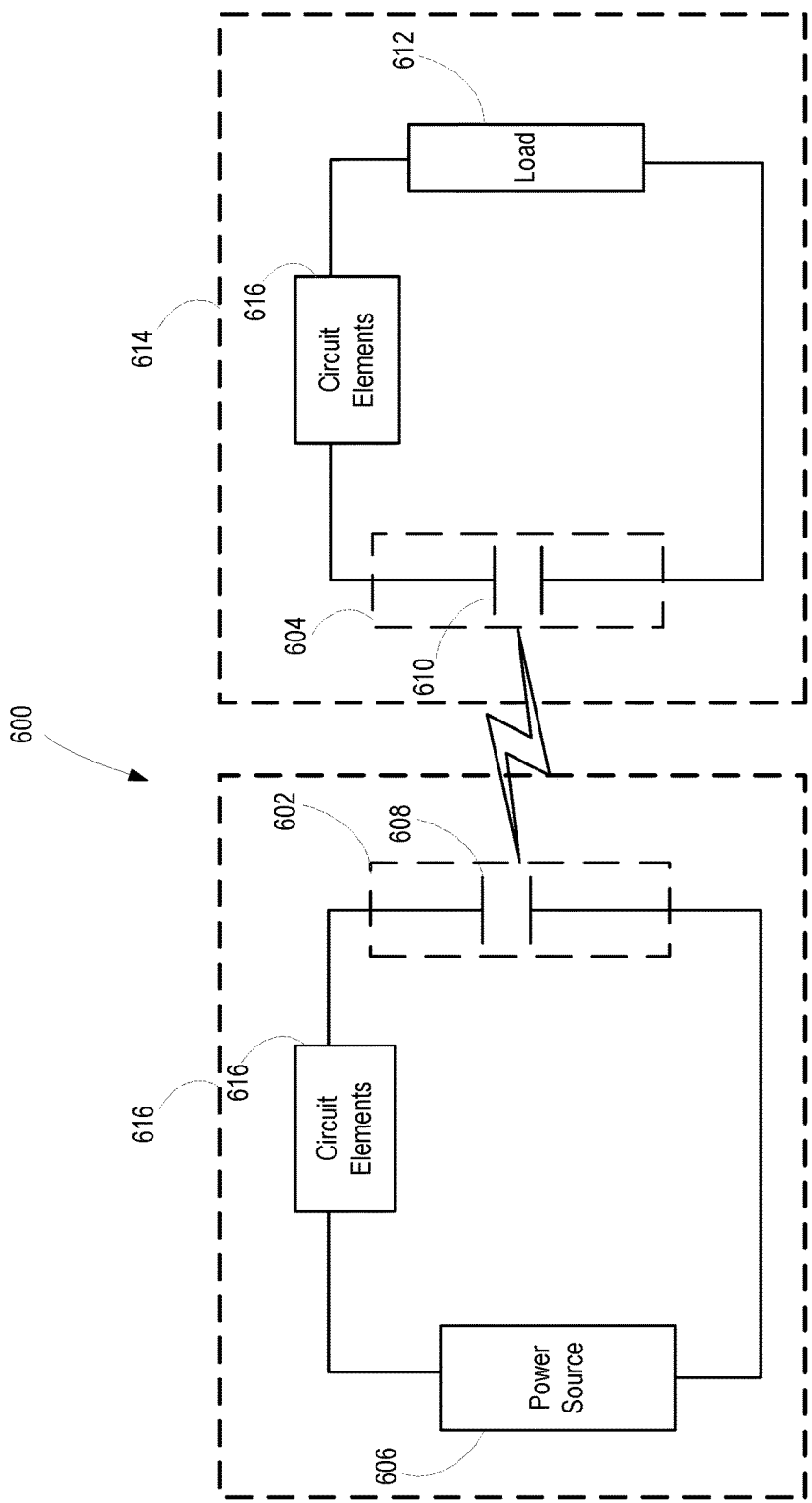

| Operational States | Common Mode (Capacitive) | Differential Mode (Capacitive) | Inductive Mode |
| --- | --- | --- | --- |
| Operational State 1 | ON | OFF | OFF |
| Operational State 2 | OFF | ON | OFF |
| Operational State 3 | OFF | OFF | ON |
| Operational State 4 | ON | ON | OFF |
| Operational State 5 | OFF | ON | ON |
| Operational State 6 | ON | OFF | ON |
| Operational State 7 | ON | ON | ON |
| Operational State 8 | OFF | OFF | OFF |

FIG. 8

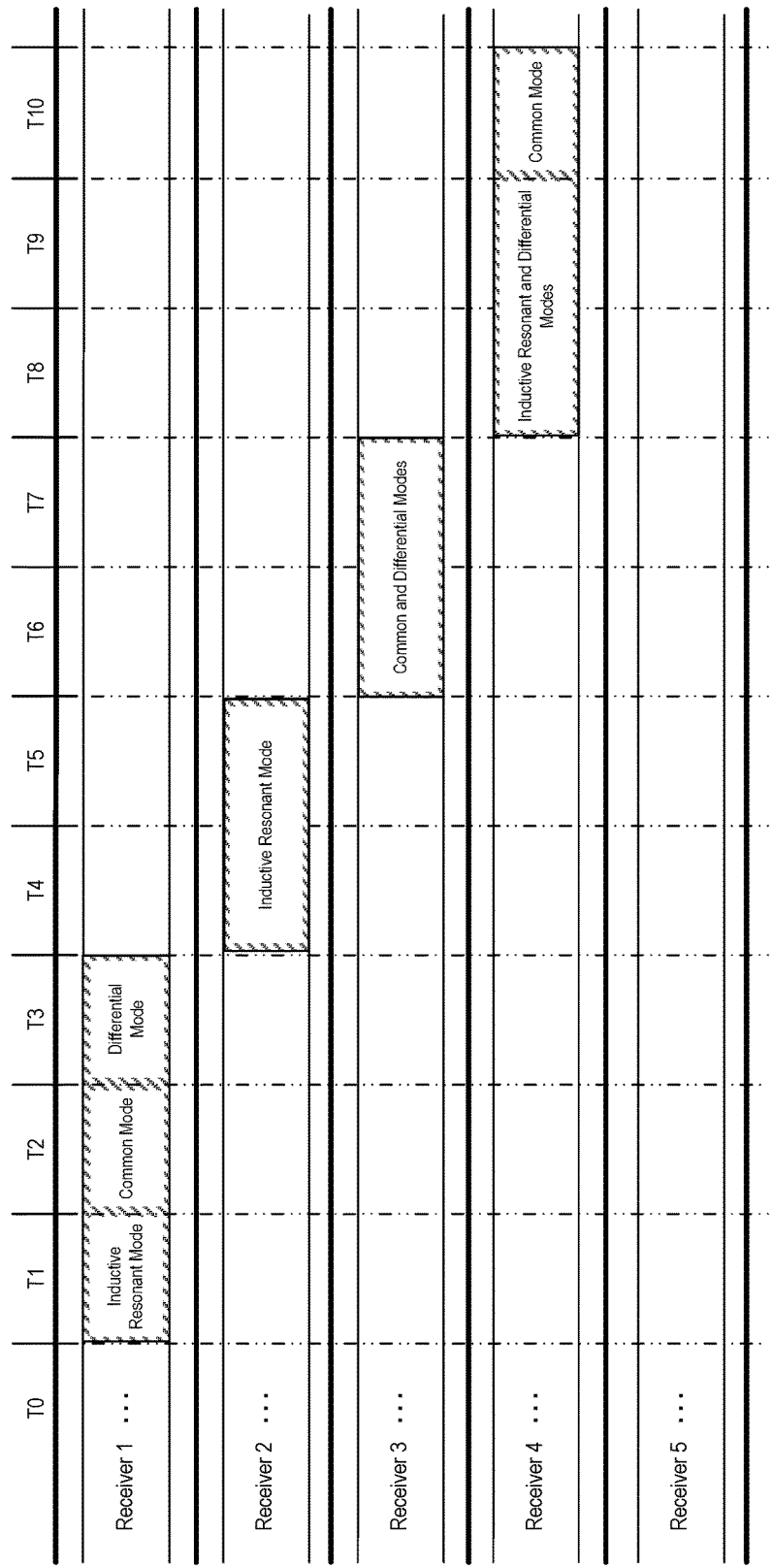

MOBILE POWER TRANSMITTER

BACKGROUND

Unless otherwise indicated herein, the materials described in this section are not prior art to the claims in this application and are not admitted to be prior art by inclusion in this section.

Electronic devices, such as mobile phones, laptops, and tablets, have become an integral part of daily life. Other machines, such as cars, which have conventionally used non-electric power sources, are increasingly relying on electricity as a power source. As electronic devices are often mobile, it may not be feasible for devices to stay connected to a power source via wires. Thus, electronic devices may use batteries to supply electric power when a device is not coupled to a fixed power source.

Current battery technology, however, often does not meet the charge capacity and/or discharge rate demands of electronic devices, which may limit the range of moveable devices. Even in cases where batteries meet the power demands of a given device, such a device usually must be coupled to a fixed charging source via wires in order to recharge its battery. Such wired charging mechanisms may limit the movement, and thus the usability, of the device while it is being charged.

SUMMARY

In one aspect, a system is provided. The system includes one or more charger vehicles, each charger vehicle including: an energy storage device and a primary wireless power transceiver, where the primary wireless power transceiver is configured to transmit power from the energy storage device to authorized wireless power receivers located within a range of the primary wireless power transceiver. The system also includes a controller configured to: determine a route in an area for the charger vehicle and determine a schedule according to which the charger vehicle travels along the route. The controller is also configured to deploy the charger vehicle in the area, where the charger vehicle is configured to travel along the route. The controller is further configured to, as the charger vehicle travels along the route, cause the primary wireless power transceiver to couple with one or more authorized wireless receivers located within the range of the primary wireless power transceiver, where the primary wireless power transceiver couples to the one or more authorized wireless receivers by establishing a respective first wireless resonant coupling link with each of the one or more authorized wireless receivers. Yet further, the controller is configured to cause the primary wireless power transceiver to transmit power to at least one of the authorized wireless receivers via the respective first wireless resonant coupling link.

In another aspect, a method is provided. The method involves detecting an authorized wireless receiver and determining a location of the authorized wireless receiver. The method also involves based on the location of the authorized wireless receiver, estimating a respective strength of a hypothetical wireless resonant coupling link between the authorized wireless receiver and each one of: the charging vehicle and each one of the repeater vehicles. The method further involves based on the estimated strength of the hypothetical wireless resonant coupling links, selecting a vehicle from one of: the charger vehicle and one of the repeater vehicles. Yet further, the method involves coupling the authorized wireless receiver with the selected vehicle by establishing a second wireless resonant coupling link with the selected vehicle.

In another aspect, a method is provided. The method involves determining a route in an area for a charger vehicle, where the charger vehicle comprises a primary wireless power transceiver. The method also involves determining a schedule according to which the charger vehicle travels along the route and deploying the charger vehicle in the area. The method further includes operating the charger vehicle to travel in the area according to the route. Further, the method includes determining a number of repeater vehicles to deploy in the area to extend a range of the primary transceiver of the charger vehicle. Yet further, the method deploying the determined number of repeater vehicles into the area, and coupling each of the repeater vehicles to the charger vehicle via a respective first wireless resonant coupling link.

In yet another aspect, a system is provided. The system includes means for detecting an authorized wireless receiver and determining a location of the authorized wireless receiver. The system also includes means for, based on the location of the authorized wireless receiver, estimating a respective strength of a hypothetical wireless resonant coupling link between the authorized wireless receiver and each one of: the charging vehicle and each one of the repeater vehicles. The system also includes means for, based on the estimated strength of the hypothetical wireless resonant coupling links, selecting a vehicle from one of: the charger vehicle and one of the repeater vehicles. The system further includes means coupling the authorized wireless receiver with the selected vehicle by establishing a second wireless resonant coupling link with the selected vehicle.

In yet another aspect, a system is provided. The system includes means for determining a route in an area for a charger vehicle, where the charger vehicle comprises a primary wireless power transceiver. The system also includes means for determining a schedule according to which the charger vehicle travels along the route and deploying the charger vehicle in the area. The system further includes means for operating the charger vehicle to travel in the area according to the route. Further, the system includes means for determining a number of repeater vehicles to deploy in the area to extend a range of the primary transceiver of the charger vehicle. Yet further, the method includes means for deploying the determined number of repeater vehicles into the area, and coupling each of the repeater vehicles to the charger vehicle via a respective first wireless resonant coupling link.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 6A to 6B is a simplified circuit diagram illustrating differential mode capacitive resonant coupling, according to an example embodiment.

FIG. 8 is a table illustrating modes of operation of a system, according to an example embodiment.

FIG. 9A to 9B illustrate a TDMA wireless resonant coupling channel, according to an example embodiment.

DETAILED DESCRIPTION

Figure 1:
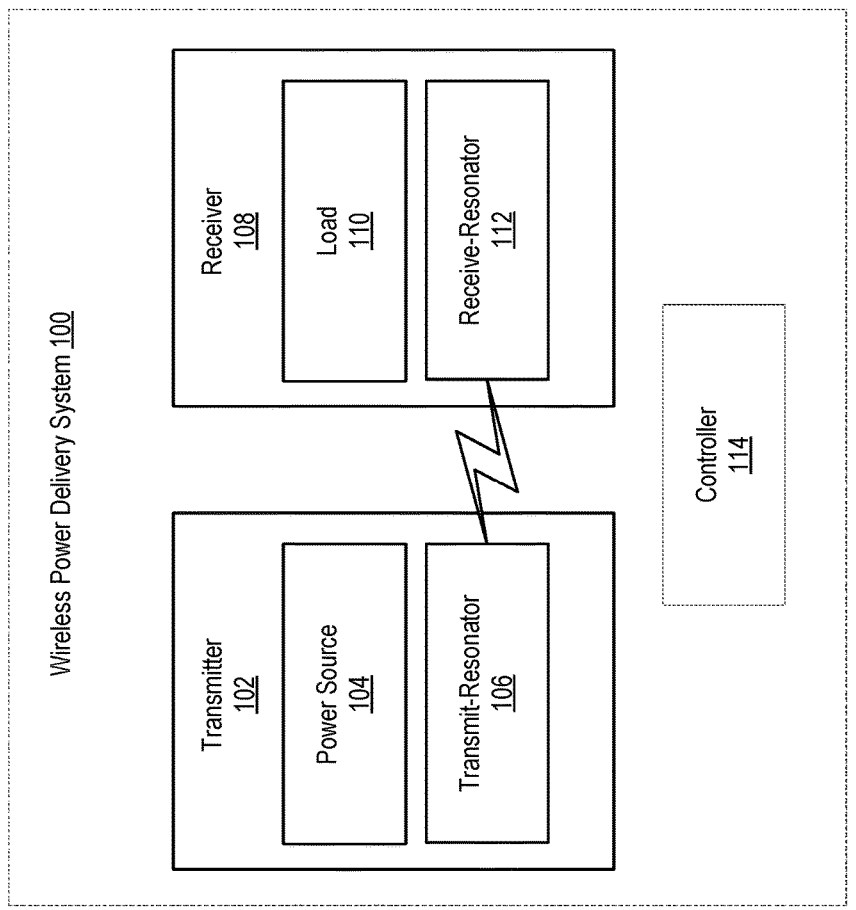
FIG. 1 is a functional block diagram illustrating the components of a wireless power delivery system, according to an example embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Furthermore, the term "capacitor" as used herein should be understood broadly as any system, including one or more elements, with a capacitive property. As such, the term "capacitor" may be used to refer to a lumped capacitive element and/or to a distributed capacitive element. Similarly, the term "inductor" as used herein should be understood broadly as any system, including one or more elements, with an inductive property. As such, the term "inductor" may be used to refer to a lumped inductive element and/or to a distributed inductive element.

I. OVERVIEW

Wireless power systems that wirelessly transfer electrical energy are currently being researched and developed in various industries. A wireless power system can include a transmitter that supplies power to one or more receivers. The transmitter can be installed in areas where wireless receivers are located in order to wirelessly supply the receivers with power. For example, the transmitter can be installed in a living room in order to power appliances and other electronic devices that are disposed in the living room.

However, in some scenarios, a device may need wireless power-delivery while the device is out of range of a fixed wireless power source. Such a scenario is increasingly more likely to occur as the use of wirelessly powered devices and appliances becomes more widespread. In such scenarios, it may be impractical or difficult to provide a fixed transmitter in every location where devices need to operate. Furthermore, it may be difficult to wireless power mobile devices via a fixed power source as the mobile devices move. Examples of devices that may be difficult to power via fixed power sources include field devices, such as mobile delivery/transportation vehicles, remote communication equipment, and clusters of devices in remote locations where fixed power sources are not available.

Disclosed herein is a wireless power system that includes a mobile node or device that is a hybrid transmitter/receiver (TX/RX) configured to move, travel, and/or "commute" to remote receivers and deliver power wirelessly. This hybrid transmitter/receiver is also referred to herein as a "mobile charger." In an example system, the mobile charger can include a transmitter component (TX) having functionality of a transmitter, a receiver (RX) component having functionality of a receiver, and an energy storage for storing power (e.g., a battery) for supply to receivers. The energy storage may also serve as a power supply for various functions of the mobile charger including, but not limited to, mobility (commuting), communications, control, and processing.

In an example, the mobile charger may take the form of an autonomous unmanned vehicle. The wireless power system, which provides wireless power coverage to an area, may plan a route for the mobile charger in the area. The system may then deploy the mobile charger in the area in order to wirelessly supply receivers in the area with power from its energy storage. The system may plan the route such that mobile charger travels near receivers that are out of range of fixed transmitters. The system may also plan the route such that the mobile charger travels near fixed power sources in order to recharge/replenish its energy storage.

In an embodiment, the system may also include mobile repeaters. Mobile repeaters may also take the form of an autonomous unmanned vehicle. However, unlike the mobile charger, mobile repeaters include a TX and an RX, but need not include an energy storage element (e.g., a battery). The mobile repeaters may use the TX/RX to couple with the wireless power signal generated by the mobile charger. The mobile repeaters may then generate their own wireless power signal that has an associated coverage area. The coverage area of the mobile repeaters may be farther away from the mobile charger than the coverage area associated with the signal generated by the mobile charger. Therefore, by extending the coverage area of the signal generated by the mobile charger, the mobile repeaters can further expand the coverage area of the system.

Also disclosed herein is an example implementation of the wireless power system described above. The example implementation involves implementing the wireless power system as a rapid transit system. In particular, the transit vehicles of the rapid transit system may be equipped with a transmitter, a receiver, and an energy storage. The vehicles that are equipped with these components may operate as mobile chargers. Further, the rapid transit system may plan the routes and schedules of the transit vehicles based on commuter needs and locations of wireless power receivers. The rapid transit system also includes mobile repeater vehicles that can be deployed to extend the ranges of the charger vehicles. Such a rapid transit system may improve the efficiency of travel for commuters, while increasing the coverage area of the wireless power system.

II. EXAMPLE SYSTEMS AND OPERATION

An example system 100 for wireless transfer of power is shown in FIG. 1. The system 100 may include various subsystems, elements, and components as described below. One or more subsystems may include a controller configured to carry out one or more of a variety of operations. In accordance with example embodiments, a controller may include one or more processors, memory, and machine language instructions stored in the memory that when executed by the one or more processors cause the controller to carry one or more of its controlling functions or operations. A controller may also include one or more interfaces for device control, communications, etc.

In further accordance with example embodiments, various functions and operations described below may be defined as methods that may be carried within the system, where at least some aspects of the methods can be implemented based on functions and/or operations carried out by one or more controllers and/or one or more of processors. Other aspects of the methods may be carried out by other elements or components of the system, under control of one or another controller, in response to environmental factors, or in response to receiving or detecting a signal, for example.

In an example embodiment, a wireless power delivery system may include a power source configured to wirelessly deliver power to a load via a transmitter and a receiver. As shown in FIG. 1, system 100 may include a transmitter 102 and a receiver 108, both of which may be considered subsystems of system 100, and a controller 114. For the sake of brevity in FIG. 1 and elsewhere herein, control functions and operations are generally described as being carried out only by the controller 114. Thus, controller 114 may be viewed conceptually as a unified control function. It should be understood, however, that as subsystems of system 100, the transmitter 102 and receiver 108 may each include its own controller, as described elsewhere herein. Alternatively or additionally, the controller 114 may include a distributed computing system, e.g., a mesh network.

As such, the various control functions and operations attributed to controller 114 may be implemented across one or more controllers, such as ones included (but not shown) in transmitter 102 and receiver 108. For example, an operation described as being carried out by the transmitter could be done so under control of a controller in the transmitter. Similarly, an operation described as being carried out by the receiver could be done so under control of a controller in the receiver.

In addition to each of the transmitter 102 and receiver 108 possibly including its own controller, each of them may also include and/be constructed of various types of electrical components. For example, electrical components may include circuit elements such as inverters, varactors, amplifiers, rectifiers, transistors, switches, relays, capacitors, inductors, diodes, transmission lines, resonant cavities, and conductors. Furthermore, the electrical components may be arranged in any viable electrical configuration, such as lumped or distributed.

Returning to FIG. 100, the transmitter 102 of system 100 may include a transmit-resonator 106. The transmit-resonator 106 may have a high Q value and may be configured to resonate at one or more resonant frequencies. Transmitter 102 may be coupled with power source 104, which may be configured to supply transmit-resonator 106 with a signal oscillating at one of the transmit-resonator resonant frequencies. In an example, the power source 104 may include a power oscillator to generate the oscillating signal, which may be oscillating at one of the transmit-resonator resonant frequencies. The power oscillator may be powered by a power signal received from an electrical outlet. For example, the electrical outlet may supply the power source 104 with an AC voltage of 120 V at a frequency of 60 Hz. In other examples, the power source may include a converter that may use a power from a power signal, which may have a low-frequency (i.e. 60/50 Hz), to generate a carrier signal that has an oscillation frequency of one of the transmit-resonant frequencies. The carrier signal may be modulated to carry the power signal and may thus be the oscillating signal supplied by the power source 104.

Furthermore, the resonant frequency $\omega_0$ at which the signal may oscillate, also called the system resonant frequency, may be chosen by controller 114 of system 100. Transmit-resonator 106 may resonate, upon receiving the oscillating signal from source 104, and consequently, may generate a field oscillating at the system resonant frequency.

Receiver 108 may include a receive-resonator 112. The receive-resonator 112 may have a high Q value and may also be configured to resonate at the system resonant frequency. The receiver 108 may also include a load 110. Thus, if receive-resonator 112 is in the range of the oscillating field (i.e., the field penetrates receive-resonator 112), resonator 112 may wirelessly couple with the oscillating field, thereby resonantly coupling with transmit-resonator 106. Receive-resonator 112, while resonating, may generate a signal that may be delivered to the load 110. Note that in the implementation where the oscillating signal generated by the power source 104 is a modulated carrier signal (generated by a converter), the receiver 108 may include a filter network. The filter network may be used to isolate the power signal from the modulated carrier signal. The power signal (i.e., 50/60 Hz signal) may then be delivered to the load 110.

In example systems, there may be more than one receiver. This is described below in further detail.

Figure 2:
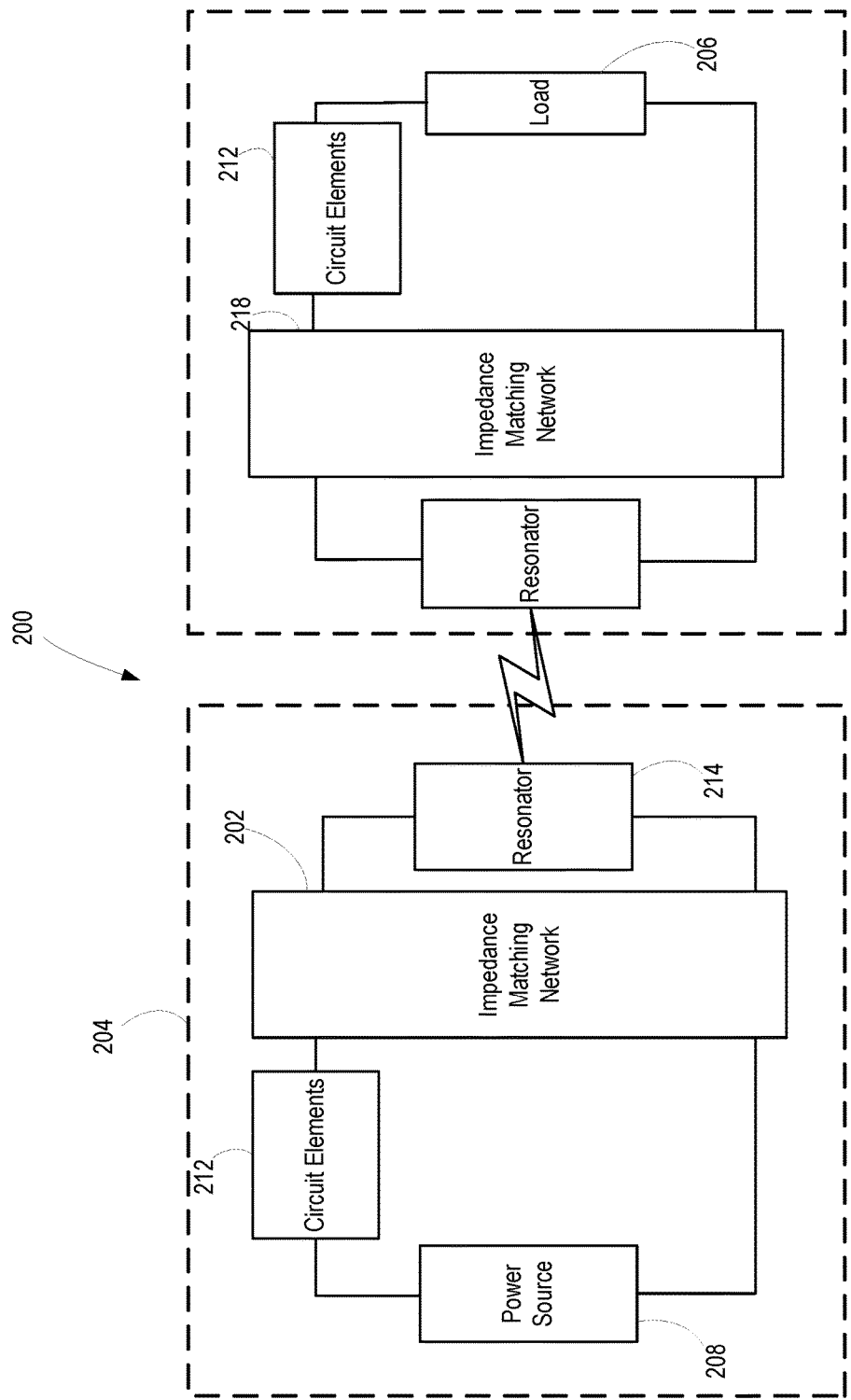
FIG. 2 is a functional block diagram illustrating an impedance matching circuit coupled to a transmitter, according to an example embodiment.

Wireless power delivery systems may include at least one impedance matching network configured to increase the efficiency of wireless power transfer. FIG. 2 illustrates an impedance matching network in a system, according to an exemplary embodiment. As illustrated in FIG. 2, the impedance matching network 202 is coupled to the transmitter 204. Further, the impedance matching network 202 may be in series, parallel, or in any other configuration with the transmit-resonator 214. In some embodiments, an impedance matching network 218 may additionally and/or alternatively be coupled to the receiver. Furthermore, the impedance matching networks 202 and 218 may each include any combination of L matching networks, pi networks, T networks, and/or multi-section matching networks.

In some embodiments, the system may deliver a determined power to the load by configuring the impedance matching network to operate at a determined impedance. In particular, a controller of the system may determine a power to deliver from the transmitter to the load. The controller may use at least the reflected impedance, from the load to the transmitter, to determine the impedance that the impedance matching network(s) may be configured to match. Accordingly, the system may deliver the determined power to the load when the impedance matching network matches the determined impedance.

More specifically, the controller of the system may generate a model, such as a SPICE model, of the system to determine the impedance that the impedance matching network may match. The model may include known values such as the actual impedance of the load, which the controller may receive from the receiver using methods described herein. However, the controller may need to determine the actual power supplied to the load from the transmitter and the reflected impedance (from the load to the transmitter) in order to fully characterize the model of the system (e.g., to derive the coupling factor k). The controller may use the fully characterized model of the system to dynamically impedance match by precisely determining the impedance that the impedance matching circuit may match.

In an embodiment, the system may include a bidirectional coupler, which may be used to determine the actual power supplied to the load from the transmitter and the reflected impedance from the load to the transmitter. The bidirectional coupler may be used in conjunction with a computer and/or a controller to precisely solve for an impedance of the load connected to it. The bidirectional coupler may also be used, in conjunction with a computer and/or a controller, to precisely solve for the amount power leaving the power source. The value of the reflected impedance of a load and the amount power leaving the source may be used to adjust the impedance matching network. Accordingly, the system may be configured to dynamically impedance match in a single step by using the bidirectional coupler to determine the actual power supplied by the source and the reflected impedance from the load to the transmitter.

However, the value of the reflected impedance from the load may change due to different factors, such as a change in the coupling between a transmitter and a receiver. The coupling between a transmitter and a receiver may change due to various factors, such as a change in the distance between the transmitter and the receiver. For example, the receiver may move during power transfer, which may change the coupling between the transmitter and the receiver. Such relative movement may change the reflected impedance of the load. Accordingly, as the reflected impedance from the load to the transmitter changes, the controller may be configured to continuously or intermittently solve for the actual power delivered to the load and the reflected load impedance, in order to dynamically impedance match.

Figure 3:
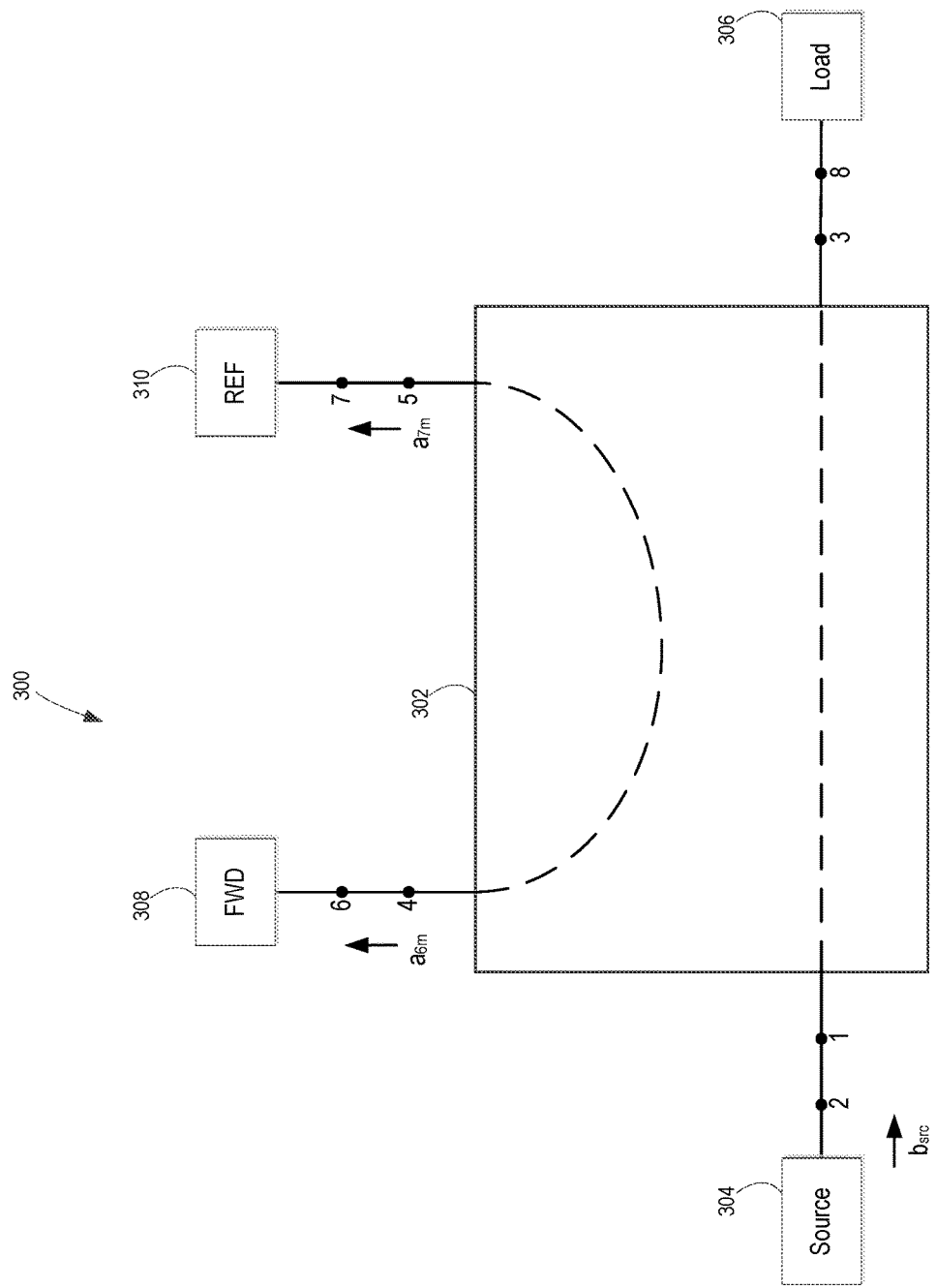
FIG. 3 is a diagram illustrating a representation of a bidirectional coupler used in a mathematical derivation, according to an example embodiment.

FIG. 3 illustrates a network representation of a system, including the bidirectional coupler 302 that is coupled in cascade between a power source 304 and a load 306, according to an exemplary embodiment. As illustrated in FIG. 3, the bidirectional coupler may be coupled between the power source at port 2 and the rest of the system (lumped into load 306) at port 8. Generally, there may be forward and reflected power waves at each port of the bidirectional coupler (ports 1, 3, 4, and 5). The forward and reflected waves, and thus the power and impedance, at each port, may be precisely determined by fully characterizing the RF properties of the bidirectional coupler. For instance, a mathematical relationship between the incoming and outgoing waves on each of the bidirectional coupler 302's ports may be used to precisely calculate the power delivered to the load 306 and the load 306's reflected impedance back to the source 304. The mathematical relationship may use an S-parameter characterization of the bidirectional coupler 302 to relate between the incoming and outgoing waves on each of the bidirectional coupler 302's ports.

The bidirectional coupler 302 may operate by coupling forward power from port 1 to port 3. An attenuated forward power may be coupled to port 4 and sampled at measurement FWD port 6. Additionally, a small amount of forward power may also be coupled into port 5 and measured at REF port 7. Likewise, reflected power is coupled from port 3 to port 1, and an attenuated power may be coupled to port 5 and sampled at measurement REF port 7. Additionally, a small amount of reflected power may be coupled into port 4 and measured at FWD port 6. Despite these non-idealities, of the forward power coupling to port 5 and the reflected power coupling to port 4, a computer and/or a controller may precisely calculate the power delivered to the load 306 and the load 306's reflected impedance.

The premeasured values of the mathematical relationship (A) may include a 4×4 S-parameter matrix and the input reflection coefficient, an S-parameter, of power source 302. Further, the non-idealities in the operation of the bidirectional coupler may be accounted for by premeasuring the 4×4 S-parameter matrix of the bidirectional coupler 302. In some embodiments, the S-parameters may be premeasured using a vector network analyzer (VNA). The measured S-parameters may be stored in a lookup table that a controller of system 300 may have access to.

Further, as explained above, the bidirectional coupler 302 may be used to periodically make real-time measurements of waves that may be used to solve for the power delivered to the load 306 and the load 306's reflected impedance. Specifically, in order to precisely calculate the power delivered to the load 306 and the load 306's reflected impedance, both the absolute magnitude of the power signals at ports 6 and 7 may be measured along with the phase of each signal with respect to the other. FWD and REF may include any measurement device or circuitry capable of measuring signals, e.g., an ammeter, a voltmeter, a spectrum analyzer, etc. Furthermore, FWD and REF may send information indicative of the respective measured signals to the controller of the system.

Furthermore, certain configurations of network 300 may simplify the S-parameter characterization of the bidirectional coupler 302. By design, FWD 308 and REF 310 may be impedance matched to the transmission line that carries the signals to each port to prevent signals from reflecting when measured at each port. For example, FWD port 308 and REF port 310 may be 50Ω terminated when a transmission line that has characteristic impedance ($Z_0$) of 50Ω is used to carry the signal to each port.

Accordingly, a controller of a wireless power delivery system may use a bidirectional coupler to solve for the reflected impedance of the load and the power delivered to the load. The system may use the solved for values in the model of the system to fully characterize the system. As such, at least the coupling factor k may be calculated. Further, the controller may use the model of the system to predict the amount of power that may be delivered to a load by adjusting the impedance that the impedance matching circuit may match.

Further, the controller may periodically measure the reflected impedance of the load and the power delivered to the load, according to a predetermined time period, which may range from microseconds to tens of seconds in length. After each measurement, the controller may periodically adjust at least one impedance matching network of the system. In an example, a controller may measure the reflected impedance and may accordingly adjust an impedance matching network every millisecond using the method described above. Other time intervals are possible. Alternatively, the controller may measure the reflected impedance of the load and the power delivered to the load continuously. In such a scenario, the controller may continuously adjust an impedance matching network of the system to deliver a determined power to the load.

In some embodiments, the wireless power delivery system may include a plurality of receivers coupled to a single transmitter with a single bidirectional coupler. In such a scenario, each receiver may reflect a signal to the transmitter due to a possible impedance mismatch at each load coupled to each receiver. The controller may use the measured values to fully characterize the system in order to determine an impedance that the impedance matching network may match.

In some embodiments, a plurality of receivers may be coupled to a single bidirectional coupler. The bidirectional coupler may use time-division multiplexing (TDM) to send the reflected signal of each receiver to the measurement device during a given interval of time. The controller may then use the method described above to solve for the reflected impedance of each load coupled to each respective receiver.

The controller of the system may adjust at least one impedance matching circuit based on the measured values. In an example embodiment, a system with a plurality of receivers may include an impedance matching network coupled to the transmitter and/or to each of the receivers. However, as the transmitter may receive different reflected impedances from each load, it may not be possible for the controller to adjust the impedance matching network to simultaneously match the reflected impedance of each receiver and the impedance of the power source. Accordingly, in some embodiments, the controller may adjust at least one impedance matching network of the impedance matching networks coupled to each of the receivers. In other embodiments, the controller may adjust the impedance matching network, coupled to the transmitter, to match the reflected impedance of a selected receiver from the plurality of receivers. As such, the selected receiver, whose reflected impedance was matched at the impedance matching network, may proportionately receive more power than the other receivers in the system. In some embodiments, wireless power delivery to the selected receiver may be more efficient than such power delivery to other receivers of the plurality of receivers.

In other examples, a system with a plurality of receivers may perform impedance matching according to time-division (TDM) and/or frequency-division (FDM) multiplexing. For instance, in a TDM scheme, each receiver may be configured to couple to the transmitter with a single impedance matching network during a specific time interval. The system may receive a reflected signal from a receiver during the specific time interval that the receiver is coupled to the transmitter. In such a scenario, the controller may adjust the impedance matching network such that each receiver may receive maximum power during the interval that the receiver is coupled to the transmitter. In an example embodiment, each receiver of the plurality of receivers may be assigned a respective time slot according to a receiver priority or a receiver order. The time slots may be equal in duration, but need not be equal. For example, receivers with higher receiver priority may be assigned to longer time slots than those receivers with a lower receiver priority.

In a FDM scheme, each receiver may be configured to couple to the transmitter with on a specific respective frequency. The system may receive a respective reflected signal from each receiver on the specific frequency that the receiver is coupled to the transmitter on. In such a scenario, the controller may adjust the impedance matching network (s), which may be connected to the transmitter and/or to each of the receivers, such that each receiver may receive a determined amount of power.

In yet another example of a system with a plurality of receivers, a controller may determine the power that each receiver may receive simultaneously from the transmitter by adjusting the impedance matching network. Specifically, the impedance of the impedance matching network may determine, at least in part, the amount of power that each receiver may receive. For example, each receiver may receive power based on at least a difference between the receiver's impedance and that of the impedance matching network. Accordingly, the controller may adjust the impedance matching network so as to increase or decrease an amount of power delivered to a respective receiver, based at least on the receiver's impedance.

A controller may determine the amount of power that each receiver may receive from the transmitter based on various parameters. In an example embodiment, each receiver may be associated with a respective priority such that higher priority receivers may receive more power during a single power distribution cycle than lower priority receivers. In other examples, a current charging state of the receiver (if the receiver is coupled to a load that includes a battery), may determine the amount of power that a receiver may receive. That is, a receiver with a low battery level may receive higher priority than a receiver with a full battery. It is understood that the controller may distribute power to each receiver of the plurality of receivers based on a variety of other parameters.

Within examples, a controller may receive information indicative of at least one parameter from a receiver when authenticating the receiver. As such, the controller may generate a dynamic priority list based on the received information. In an example embodiment, the dynamic priority list may be updated when a receiver connects or disconnects from a transmitter. Further, a controller may store the received information and the corresponding dynamic priority lists either locally or on a server. In other examples, a receiver may send a controller updated information if a parameter of the receiver changes after the initial synchronization process. In other examples, a controller may periodically query a receiver, via a side-channel communication link, for example, to request information regarding the state of the receiver. As such, the controller may receive, via the side channel, for example, information such as the current charging state of a battery of a receiver or the current power requirements of a receiver.

In yet other examples, a system may include one or more impedance matching networks in each receiver of the plurality of receivers. A system may additionally or alternatively include impedance matching networks in the transmitter and at least one of the receivers. In such scenarios, a controller may be configured to adjust a plurality of impedance matching networks of the system such that each receiver may receive a determined amount of power from the transmitter.

Additionally or alternatively, the system may use the dynamic impedance matching method described above to detect a parasitic receiver. Specifically, a controller of the system may use information, such as nominal impedance, about authorized receivers to generate a circuit model of at least a portion of the wireless power delivery system. Additionally or alternatively, the controller may generate the circuit model based on an approximation, estimation, or other determination of a coupling condition between the transmitter and the receiver, which may be based on their relative locations. Based on the circuit model, the controller may calculate an ideal power reception amount that it may receive from each receiver. Accordingly, the controller may compare the calculated ideal power received and the actual power received. If the ideal and actual powers received are not equal within a specified margin of error, the controller may determine that a parasitic device may be present in the system. For example, the controller may determine that a parasitic device may be present in the system if the value of the calculated power received varies by more than 10% of the value of the actual power received. Additionally or alternatively, the controller may use other methods disclosed herein to identify parasitic receivers.

A. Coupling Modes

A transmitter and a receiver of a wireless power delivery system may establish a wireless coupling resonant link, and thus become resonantly coupled, via various coupling modes. Each coupling mode is associated with a type of resonator that may be included in a transmitter and/or a receiver. Accordingly, a system may excite a type of resonator so as to provide a wireless resonant link via the associated coupling mode. Furthermore, the system may maintain multiple wireless resonant links of different coupling mode types at any given time. Within examples, a transmitter and a receiver of a system may include at least one of three resonator types. As such, the operational state of a system may utilize at least one of three resonant coupling modes.

Figure 4A:
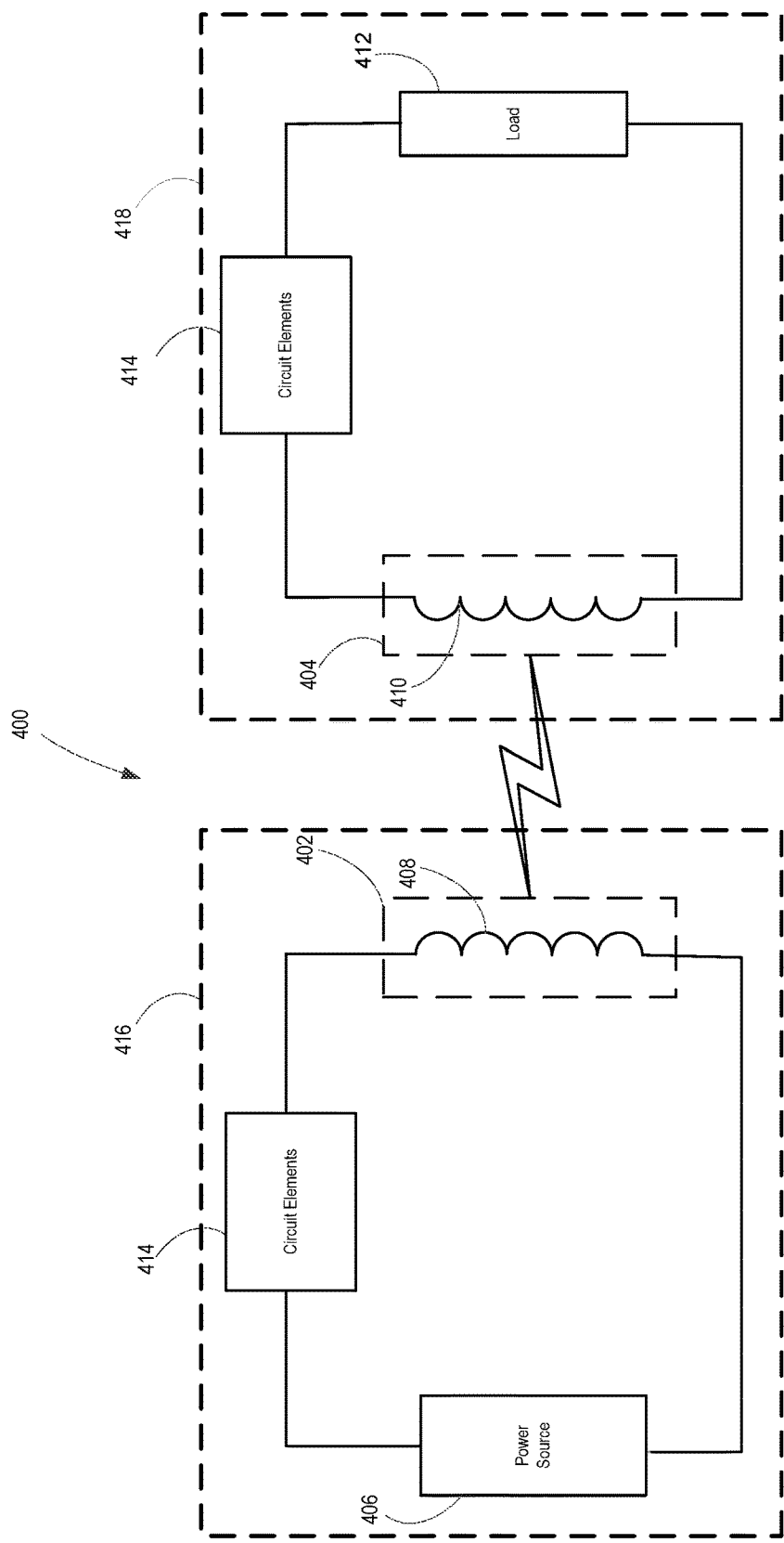
FIG. 4A to 4B illustrate a simplified circuit diagram of inductive resonant coupling, according to an example embodiment.
Figure 4B:
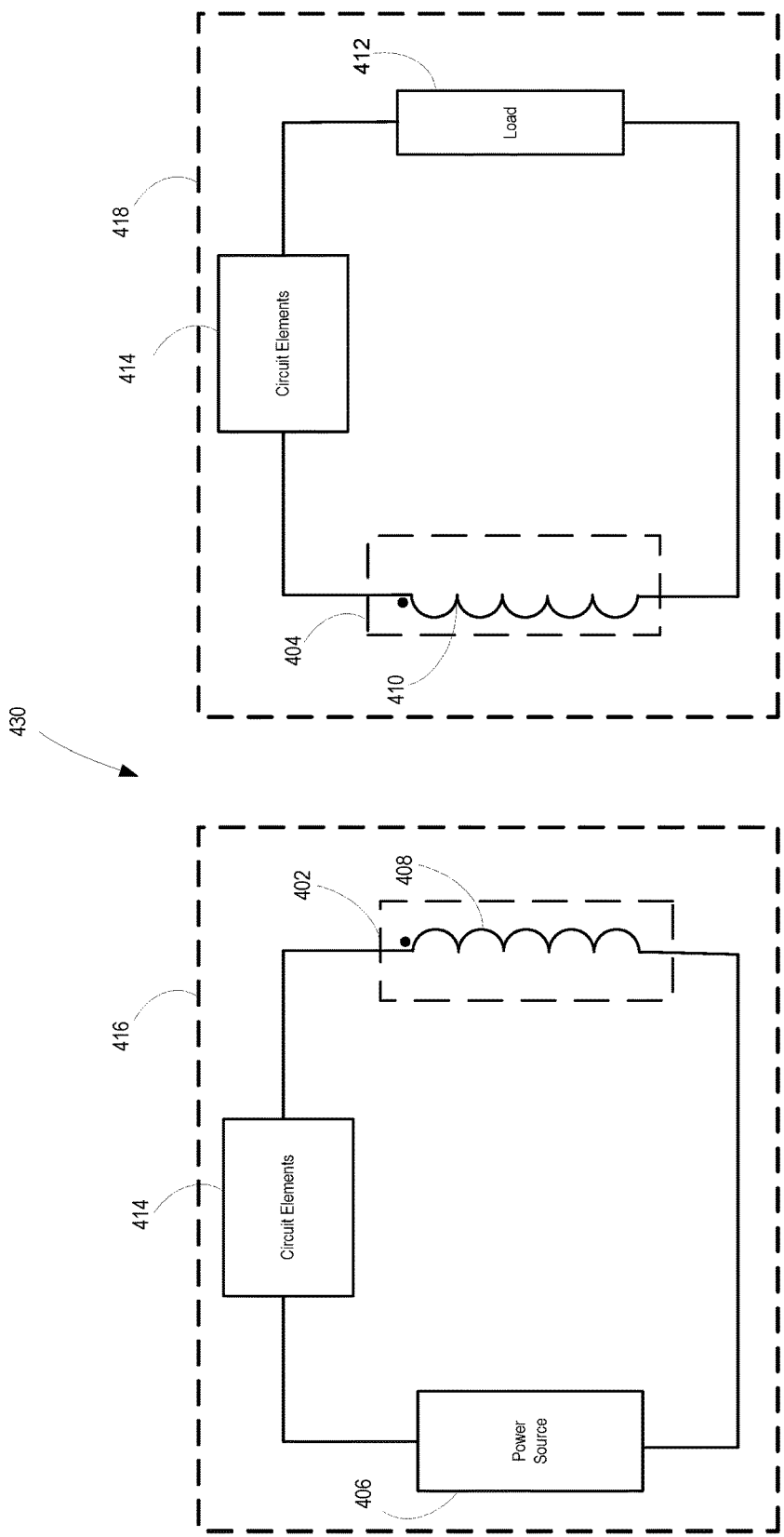

FIG. 4A and FIG. 4B illustrate an inductive resonant coupling mode, the first coupling mode, according to an exemplary embodiment. Each of transmit-resonator 402 and receive-resonator 404 may include at least an inductor. Further, each resonator may be configured to resonate at least at the system resonant frequency of system 400. Transmit-resonator 402 may resonate upon receiving a signal, from power source 406, that is oscillating at the system resonant frequency. Thus, transmit inductor 408 of transmit-resonator 402 may generate a magnetic field oscillating at the system resonant frequency. Receive-resonator 404 may couple with the oscillating magnetic field if it is within proximity to the transmit-resonator 402. As a result, a wireless coupling resonant link may be established. Coupled receive-resonator 404 may then resonate, and may therefore generate a signal that may be delivered to load 412.

Additionally or alternatively, the system may include a transmitter and/or a receiver that include a capacitive resonator, which may be operable to couple the transmitter and the receiver. In an example embodiment, each of the transmitter capacitive resonator and the receiver capacitive resonator may include at least a capacitor. The transmit-resonator may resonate upon receiving, from the power source, a signal oscillating at the system resonant frequency. As the transmit-resonator resonates, the capacitor of the transmit-resonator may generate an electric field oscillating at the system resonant frequency. The receive-resonator, if in proximity to the transmit-resonator, may couple with the oscillating electric field; thereby establishing a wireless coupling link between the transmitter and the receiver. As such, the receive-resonator may resonate, and may therefore generate a signal that may be delivered to a load coupled to the receiver.

In an example embodiment, a system may include at least one of two types of capacitive resonators, each of which may be associated with a respective coupling mode. The two capacitive resonators differ in the configuration of their respective capacitors. The first capacitive resonator may include a common mode capacitor, which may support a capacitance between a single conductor and ground. A common mode capacitive resonator may be operable to provide a wireless coupling link via a coupling mode termed common mode. The second capacitive resonator type may include a differential mode capacitor, which may support a capacitance between two conductors. A differential mode capacitive resonator may be operable to provide a wireless coupling link via a coupling mode termed differential mode.

Figure 5A:
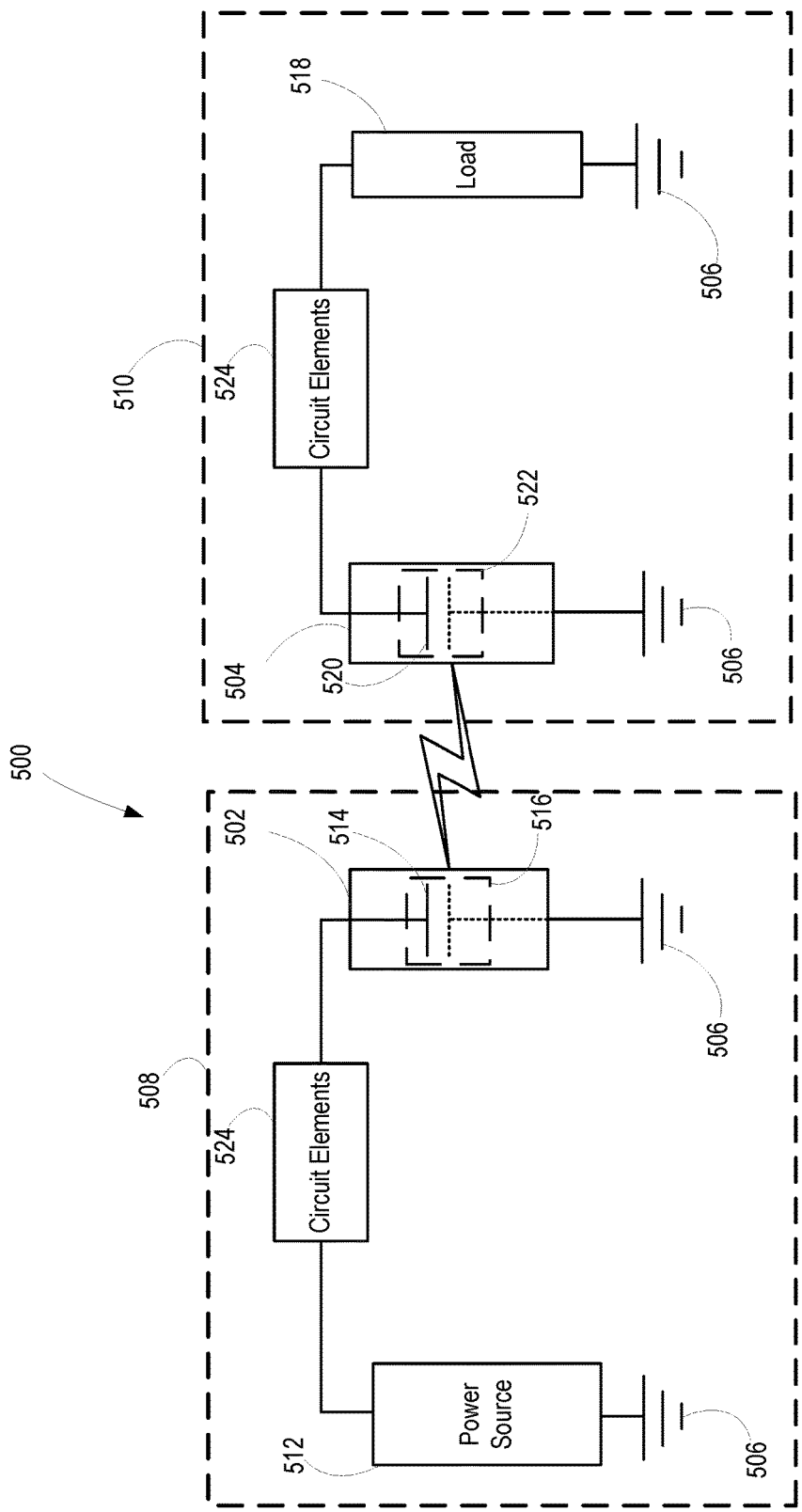
FIG. 5A to 5C illustrate a simplified circuit diagram of common mode capacitive resonant coupling, according to an example embodiment.
Figure 5B:
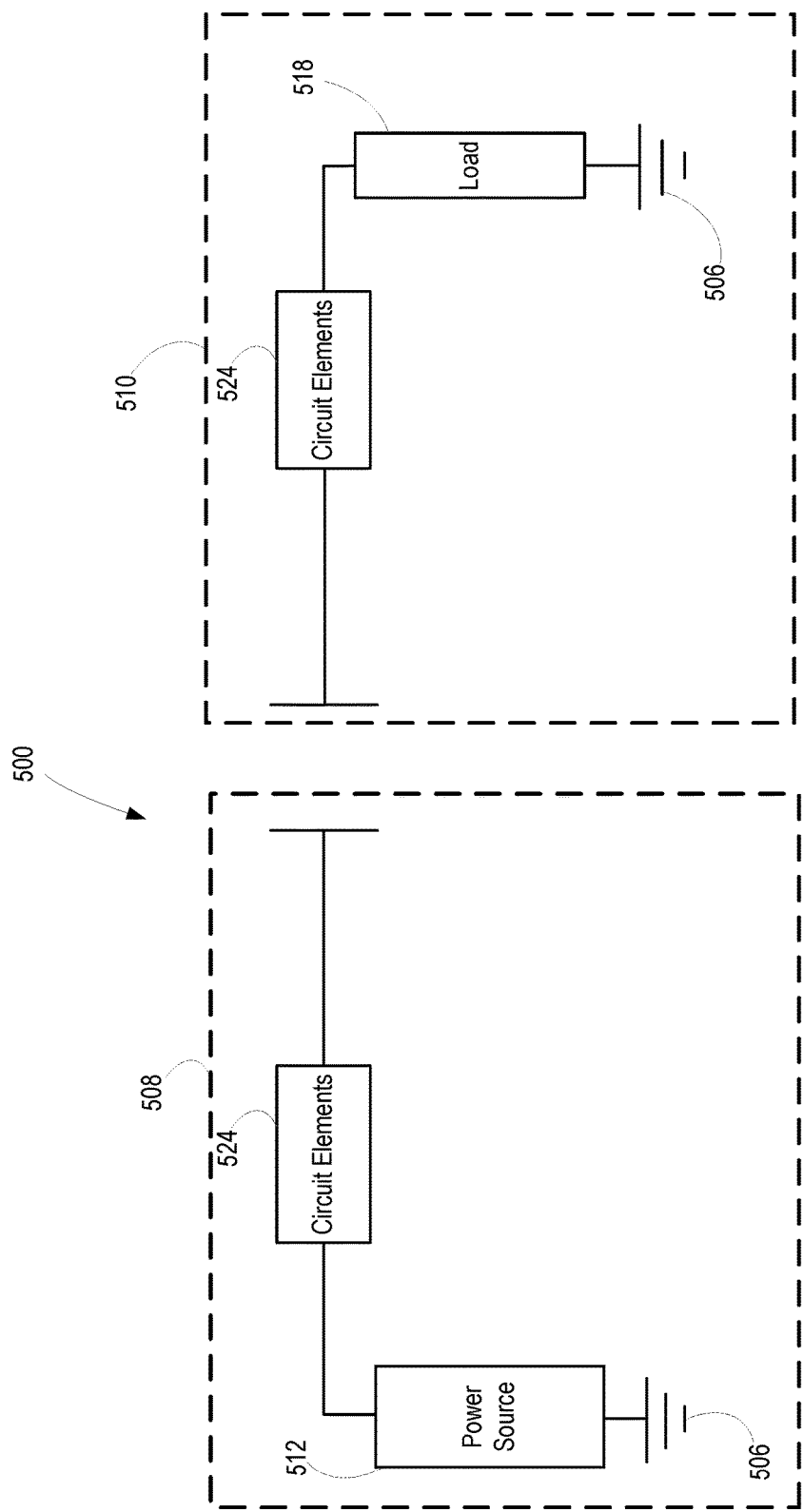
Figure 5C:
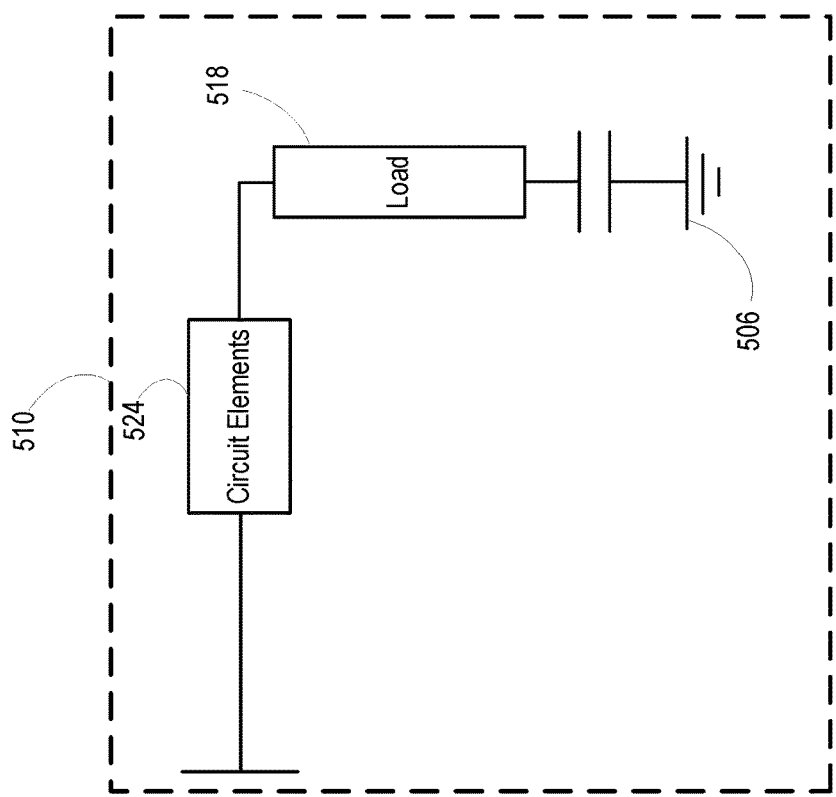
Figure 5C:
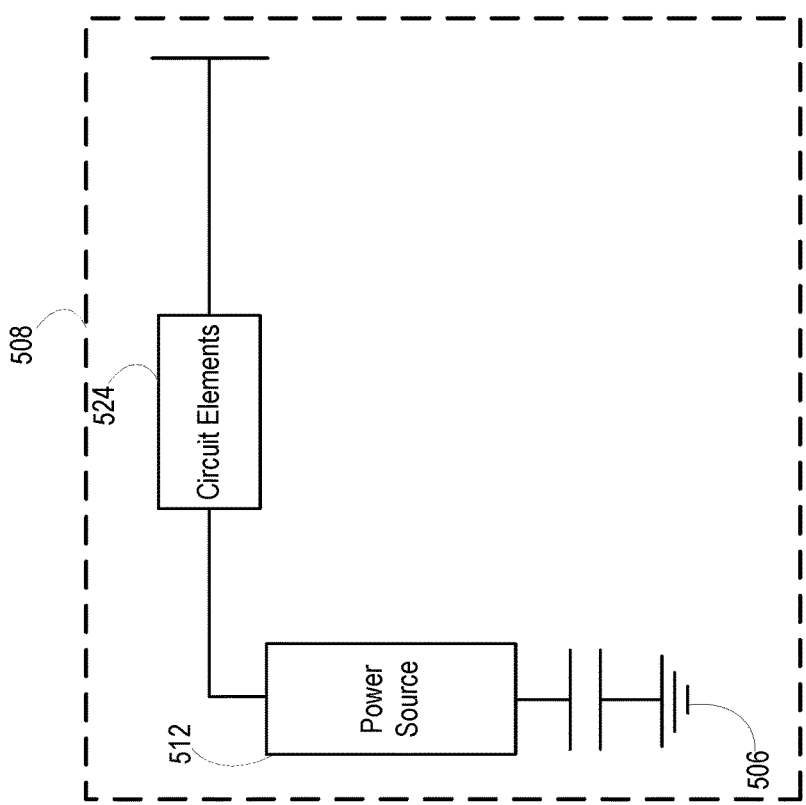

FIG. 5A, FIG. 5B, and FIG. 5C illustrate a system, in three representations, that includes a common mode capacitive resonator, according to an exemplary embodiment. Each of transmit-resonator 502 and receive-resonator 504 includes a common mode capacitive resonator. As such, each resonator includes a common mode capacitor that includes a conductor and ground reference 506. Ground reference 506 may conduct current to complete the circuit of transmitter 508 and receiver 510. Further, transmitter 508 may be coupled with power source 512 that may be connected on one end to ground reference 506 and on the other end to at least transmitter conductor 514. Optionally power source 512 need not be connected to the ground reference 506. Transmit-resonator 502 may resonate upon receiving, from power source 512, a signal that is oscillating at the system resonant frequency. As the transmit-resonator 502 resonates, common mode capacitor 516 of the transmit-resonator 502 may generate an electric field oscillating at the system resonant frequency. Receiver 510 may include load 518 that may be connected on one end to ground reference 506 and on the other end to receiver conductor 520. If within the near field of transmit-resonator 502, the receive-resonator 504 (which includes common mode capacitor 522) may couple with the oscillating electric field, thereby establishing a wireless resonant coupling link. As such, receive-resonator 504 may resonate, and may generate a signal that may be delivered to the load.

In some embodiments, the ground reference of the common mode capacitors may be connected to earth ground via a direct or an indirect connection. For example, the ground reference may include the infrastructure of a building housing the wireless power system, which may include an indirect connection to earth ground. In other examples, the ground reference may include a conductive object connected to common mode capacitors. As such, the conductive object may provide a conductive return path in a circuit including a transmitter and/or a receiver.

Figure 6B:
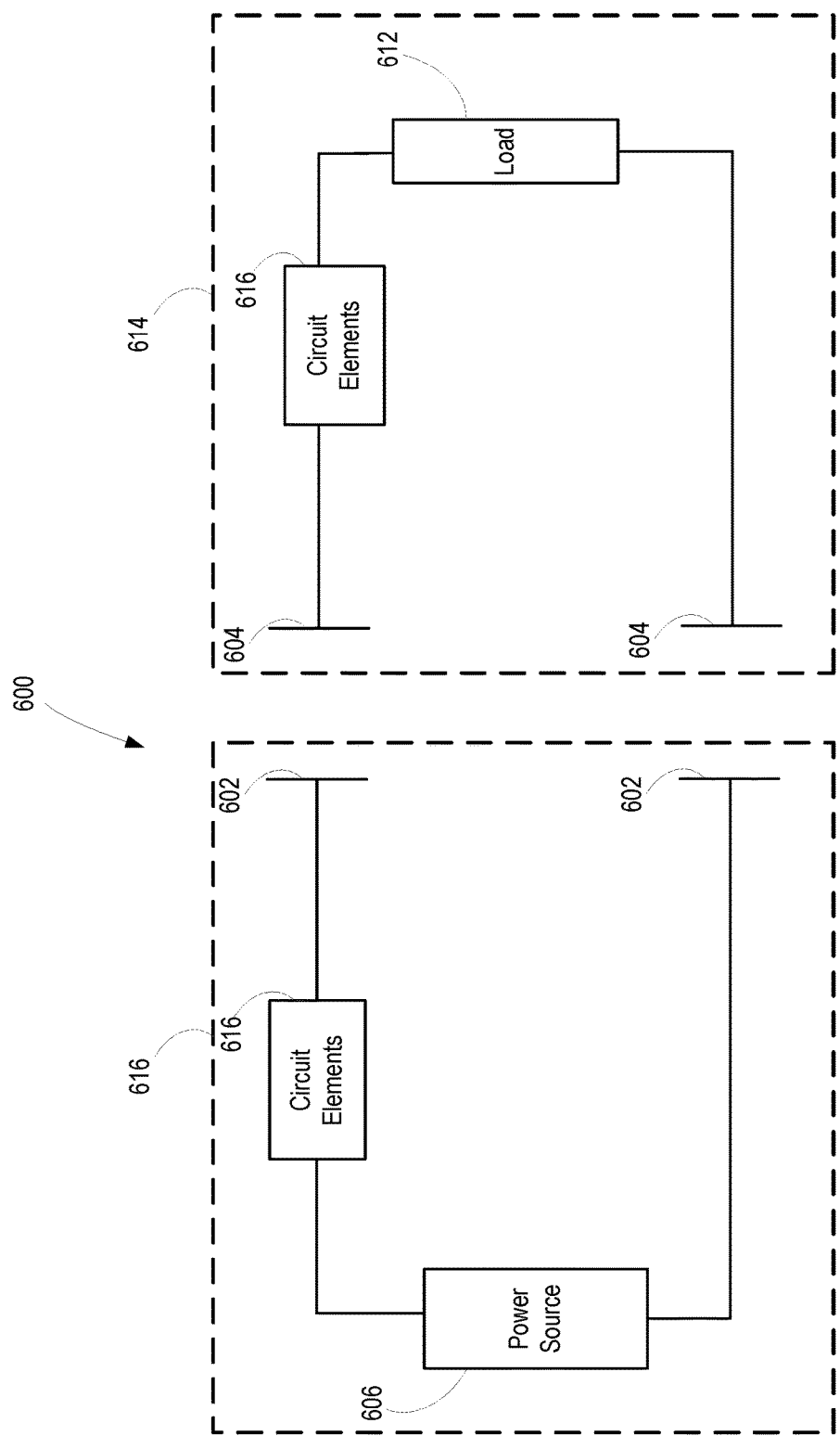

FIGS. 6A and 6B illustrate a system 600, in two representations, which includes a differential mode capacitor, according to an exemplary embodiment. Each of transmit-resonator 602 and receive-resonator 604 may include at least one capacitor. Power source 606 may supply a signal oscillating at a system resonance frequency to transmit-resonator 602. Transmit-resonator 602 may resonate upon receiving the signal from source 606. As transmit-resonator 602 resonates, transmitter differential mode capacitor 608 may generate an electric field oscillating at the system resonant frequency. Receive-resonator 604, if in proximity to the transmit-resonator 602, may couple with the oscillating electric field. As such, a wireless resonant coupling link may be established between the transmitter and the receiver. Furthermore, receiver differential mode capacitor 610 may resonate, and may therefore generate a signal that may be delivered to load 612 coupled to receiver 614.

In example embodiments, a system may establish a wireless resonant coupling link between a transmitter and a receiver according to one or more coupling modes that include a capacitive resonant coupling mode and an inductive resonant coupling mode. A transmitter and a receiver may each include the resonators necessary to establish a wireless link in each of the coupling modes. Furthermore, a wireless coupling link may be maintained between the transmitter and the receiver that utilizes different coupling modes simultaneously or individually. In some examples, the resonators may include a single circuit element that may be configured to operate either as an inductor, a capacitor, or both. In an example, an element may include coils shaped like a pair of conductor plates, such that the element may operate as an inductor and/or a capacitor. In other examples, a transmitter or receiver may include multiple resonators arranged in a resonator bank. The resonator bank may include at least one resonator that may include an inductor, and at least one resonator that may include a capacitor. Accordingly, the resonator bank may be configured to establish wireless resonant coupling links in capacitive and inductive resonant coupling modes.

Figure 7:
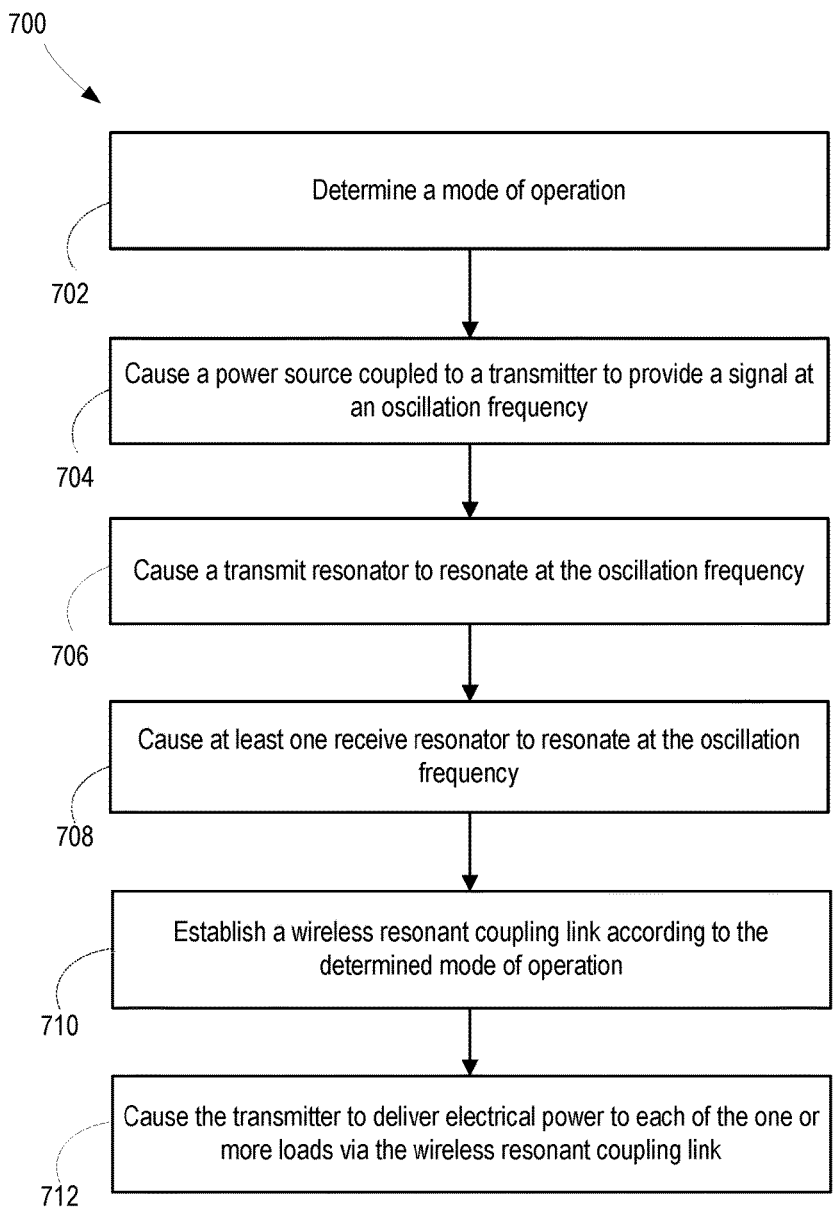
FIG. 7 illustrates a method of delivering electrical power from a transmitter to one or more loads, according to an example embodiment.

FIG. 7 illustrates a flowchart showing a method 700 that may establish a wireless resonant coupling link between a transmitter and a receiver of a system, according to an exemplary embodiment. In some embodiments, method 700 may be carried out by a controller of a system.

Furthermore, as noted above, the functionality described in connection with the flowcharts described herein can be implemented as special-function and/or configured general-function hardware modules, portions of program code executed by one or more processors for achieving specific logical functions, determinations, and/or steps described in connection with the flowchart shown in FIG. 7. For example the one or more processors may be part of controller 114. Where used, program code can be stored on any type of non-transitory computer-readable medium, for example, such as a storage device including a disk or hard drive.

In addition, each block of the flowchart shown in FIG. 7 may represent circuitry that is wired to perform the specific logical functions in the process. Unless specifically indicated, functions in the flowchart shown in FIG. 7 may be executed out of order from that shown or discussed, including substantially concurrent execution of separately described functions, or even in reverse order in some examples, depending on the functionality involved, so long as the overall functionality of the described method is maintained.

As shown by block 702, of FIG. 7, method 700 may involve determining an operational state of a system. The determined operational state may include at least one coupling mode. For example, the determined operational state may include any of the wireless coupling modes described herein. Within examples, the determined operational state may be determined by a controller of the system. As shown by block 704, method 700 further includes causing a power source that is coupled to a transmitter of a system to provide a signal at an oscillation frequency. For example, the oscillation frequency may be one of the one or more resonant frequencies of the transmitter. In some embodiments, the oscillation frequency may be a frequency within a range of resonant frequencies of the transmit-resonator.

Accordingly, as shown by block 706, a transmit-resonator may resonate at the oscillation frequency upon receiving the signal from the power source of the system. The oscillating transmit-resonator may generate a field oscillating at the oscillation frequency. In some embodiments, the transmit-resonator may generate a field that may be oscillating at a frequency within a range of resonant frequencies of the receive-resonator. As shown by block 708, if a receive-resonator is located within the range of the oscillating field generated by the transmit-resonator, the receive-resonator may also resonate at the oscillation frequency. As a result, as shown by block 710, a wireless resonant coupling link may be established according to the determined operational state. Finally, method 700 may cause the transmitter to deliver electrical power to each of the one or more loads via the established wireless resonant coupling link, as shown by block 712.

FIG. 8 illustrates different combinations of coupling modes that may form wireless resonant coupling link, according to an exemplary embodiment. In an example embodiment, a system may include a transmitter and a receiver both having three different types of resonator elements (e.g. an inductor, a common-mode capacitor, and a differential-mode capacitor). Accordingly, a wireless resonant coupling link between the transmitter and the receiver may include various combinations of the three different coupling modes. Accordingly, combinations 1-7 each include supporting a wireless resonant coupling link via at least one coupling mode. Operational state 8 represents when the system is not operating or when the transmitter and receiver are not coupled via a wireless resonant coupling link. Within examples, the various combinations of coupling modes forming the wireless coupling link between the transmitter and the receiver may be determined and controlled by a controller. In other examples, a user may provide an input to the controller that may direct the system to form a wireless resonant coupling link with a given combination of coupling modes.

In an example embodiment, a system may establish wireless resonant coupling links between a transmitter and a plurality of receivers. In such a scenario, the plurality of receivers may all operate in a single operational state to establish simultaneous links to the transmitter. In other scenarios, each of the receivers may establish a wireless resonant coupling link with the transmitter using a different coupling mode. Transmitters of such systems may include a resonator bank configured to enable simultaneous links with a plurality of receivers via one or more coupling modes.

As explained elsewhere herein, a system may employ time division multiple access (TDMA) to establish a wireless resonant coupling link that may be shared by a plurality of receivers. Specifically, the wireless resonant coupling link may be divided into different time slots within a given time frame. As such, each receiver of the plurality of receivers may receive electrical power from the transmitter during an assigned time slot within the given time frame. In other words, within the given time frame, the transmitter may distribute power to a given receiver during a given time slot. Each receiver may be assigned to receive power during one or more time slots within the time frame.

FIG. 9A illustrates a TDMA wireless resonant coupling link, according to an exemplary embodiment. Specifically, the ten time slots (T1-T10) may represent a single time frame of power distribution. The same distribution may be repeated in subsequent time slots T11-T20 and/or time frames (not shown). Furthermore, a controller of the system may assign each receiver of the system one or more time slots during which the receiver may receive power from the transmitter. In this example, receivers 1-4 are configured to receive power from the transmitter during various time slots of this time frame, whereas receiver 5 is not configured to receive power. In such a scenario, a controller may assign receivers 1-4 specific time slots during which they may receive power from the transmitter. The power may be transferred to a receiver during a given time slot according to any of the modes of operation of a system. Within examples, the controller may determine the operational state (e.g., the coupling mode type(s)) of each receiver during each interval of time. In other examples, the operational state may be input by a user of the respective receiver.

Figure 9B:
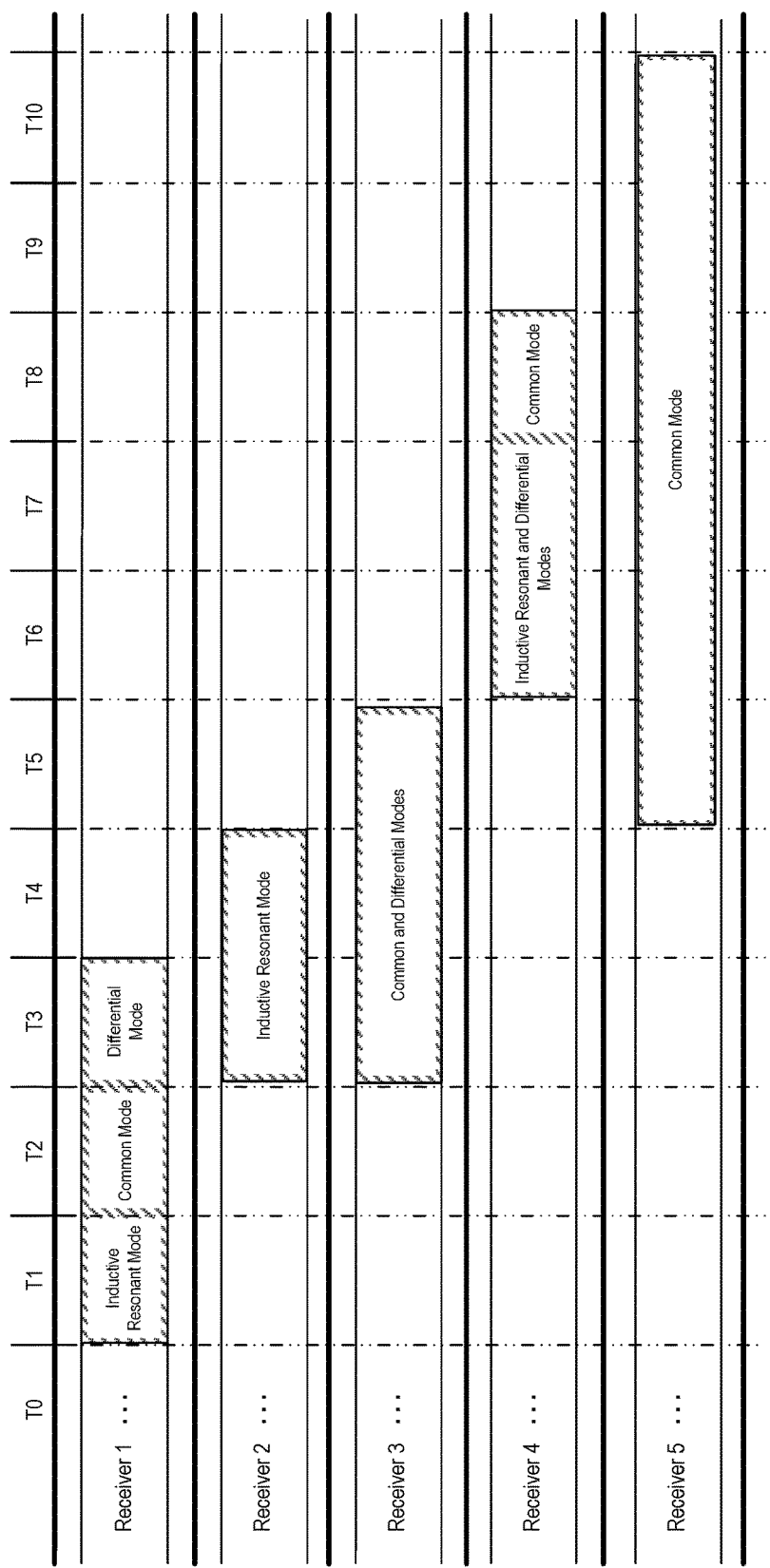

FIG. 9B illustrates a TDMA wireless resonant coupling link, according to an exemplary embodiment. Similar to the system illustrated in FIG. 9A, the ten time slots (T1-T10) may represent a single frame of power distribution. However, as illustrated in FIG. 9B, more than one receiver may receive power simultaneously from the transmitter. Furthermore, each receiver may receive power according to any of the modes of operation of the system. In some examples, the receivers receiving power simultaneously may receive power according to the same mode of operation. In other examples, the receivers receiving power simultaneously may receive power according to different modes of operation.

In accordance with some embodiments, the components (e.g., transmitter and receiver) of a system may include circuit elements (shown as element 212 in FIG. 2, element 414 in FIG. 4, element 524 in FIG. 5, and element 616 in FIG. 6), such as inductors, capacitors, transistors, inverters, amplifiers, rectifiers, varactors, relays, diodes, transmission lines, resonant cavities and switches, which may be arranged to facilitate switching between the different coupling modes of a system. For example, a system may switch between the different modes by having both a coil and one or two (or more) conductors in a combination of series-parallel connections. In other examples, a system may dynamically suppress or enhance a coupling mode by dynamically adding lumped element reactive components in series or parallel between the elements of the resonator of each mode.

In some examples, the operational state of a system may be determined by a controller of the system. For example, a controller may determine the mode of the operation of the system based on data that it may receive from a receiver, such as the receiver's power demands, preferred operational state, and location. Alternatively or additionally, the controller may determine the operational state based on data that may be input by a user of the system. Furthermore, the operational state may be determined based on the status of the system and/or environmental conditions.

In some embodiments, a controller may switch the operational state in response to detecting a parasitic device (using methods described herein) that may be diverting power from a legitimate receiver. In an example, a system may be operating in a state that utilizes common mode resonant coupling. However, a controller may detect a parasitic device that may also be coupled to the transmitter using common mode. In response, the controller may stop wireless power delivery via the common mode, and may enable wireless power delivery via a differential capacitive coupling mode, an inductive resonant coupling mode, or both. In other embodiments, a controller may use environmental conditions to determine the system's operational state. For example, a controller may receive information indicative of a presence of high ferrite content objects in the system's environment. Accordingly, the controller may determine to operate in a mode that does not utilize inductive resonant coupling mode.

A controller may also determine an amount of electrical power that a system may deliver to each load in the system. The controller may also make a determination of how much electrical power to deliver to each load via each available coupling mode in the system. Accordingly, in an example, the controller may cause the power source to direct the determined amount of power to a resonator bank and further control the delivery of power to the respective receivers via the respective determined coupling modes.

Furthermore, external elements may be installed in a system's environment, which may be configured to improve or otherwise modify the performance of the system. In some embodiments, field concentrators may be configured to shape an oscillating magnetic field (of an inductive resonator), an oscillating electric field (of a capacitive resonator), or both. For example, high permeability materials, such as ferrites, may be installed in a system's environment. In an example embodiment, while the system is operating in inductive resonant coupling mode, the high permeability material may be arranged so as to shape the oscillating magnetic field and extend its range. Similarly, high permittivity dielectric materials may be arranged in a system's environment. A capacitor of the system may utilize the high permittivity dielectric materials to increase or otherwise modify its capacitance, and hence adjust the properties of the electric field produced by a resonant capacitor. Furthermore, conductors may also be arranged in a system's environment so as to affect the magnetic and/or the electric field produced by the system's resonators.

Within examples, a system may include circuit elements that may be used as necessary in the system to implement the system's functionality. For example, a system may include circuit elements such as inverters, varactors, amplifiers, transmission lines, resonant cavities rectifiers, transistors, switches, relays, capacitors, inductors, diodes, and conductors. A relay may be used for switching between circuit elements configured to operate each coupling mode. As explained herein, a switch may connect a load to a receiver, such that the load is switchably coupled to the receive-resonator. Other examples of possible uses for various circuit elements are possible.

B. Power Transfer to Legitimate Receiver(s)

Figure 10:
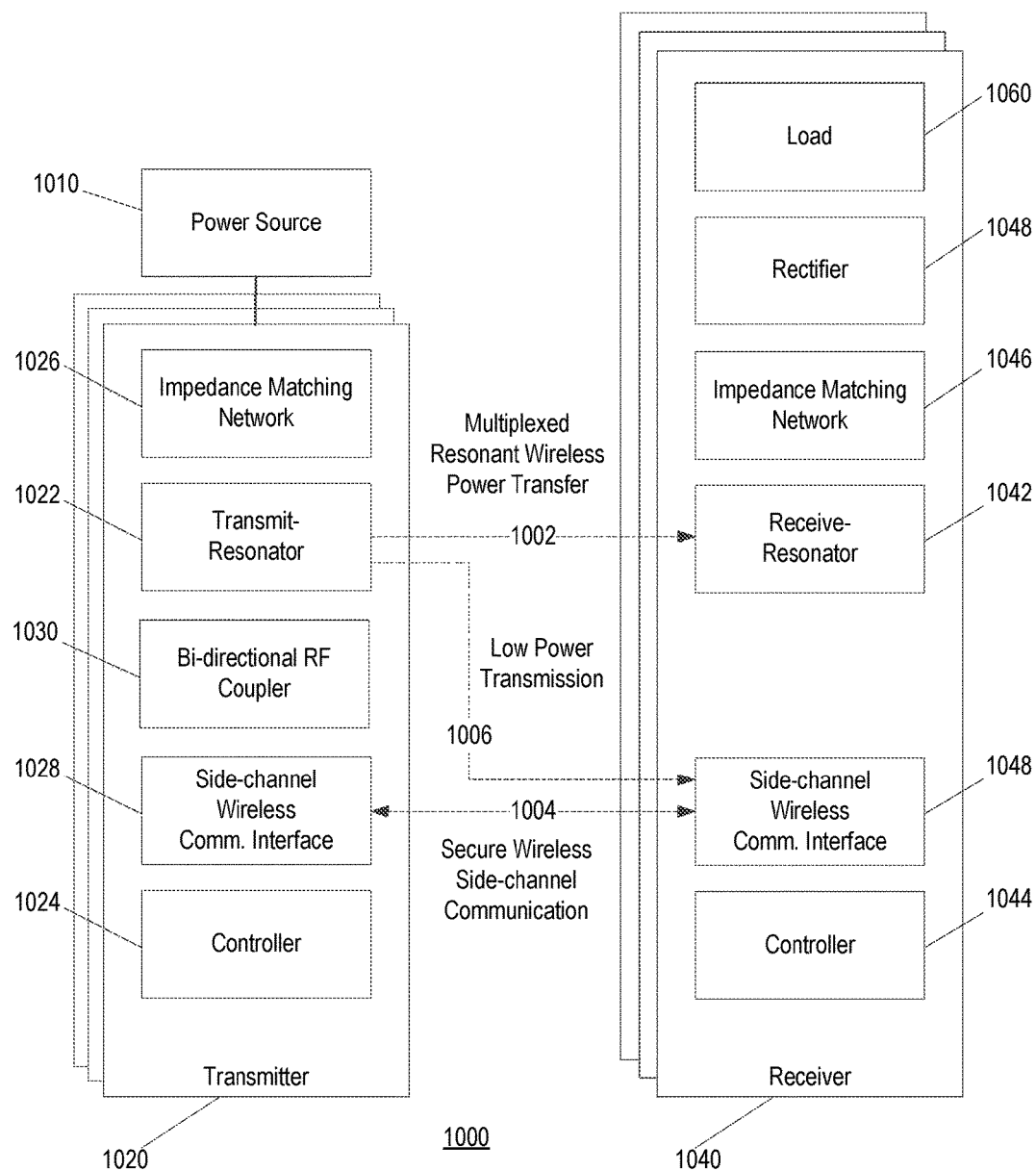
FIG. 10 is a functional block diagram illustrating a wireless power delivery system employing side-channel communications, according to an example embodiment.

FIG. 10 illustrates a resonant wireless power delivery system 1000 according to an example embodiment. The system 1000 includes a power source 1010, a transmitter 1020, and a receiver 1040. The transmitter 1020 receives power from the power source 1010 and wirelessly transfers this power to the receiver 1040. The transmitter 1020 may be one of a plurality of transmitters. The receiver 1040 is one of a plurality of receivers that may receive power from the transmitter 1020.

The transmitter 1020 includes a transmit-resonator 1022, and the receiver 1040 includes a receive-resonator 1042. The transmit-resonator 1022 is supplied with a power signal from the power source 1010 oscillating at a resonant frequency $\omega_0$. As described above, the transmit-resonator 1022 resonates at the resonant frequency $\omega_0$ and generates a field that oscillates at the resonant frequency $\omega_0$. The receiver-resonator 1042 is correspondingly configured to resonate at the resonant frequency $\omega_0$. The receiver 1040 is placed in sufficient proximity to the transmitter 1020 to couple the receive-resonator 1042 with the field generated by the transmit-resonator 1022, e.g., the receiver-resonator 1042 is within the field of the transmit-resonator 1022 depending for instance on the quality factor Q as described above. This coupling establishes a resonant power transfer link 1002 that provides a wireless conduit for power transfer between the transmit-resonator 1022 and the receive-resonator 1042. As also described above, the transmit-resonator 1022 and the receive-resonator 1042 may be coupled via an oscillating magnetic field and/or an oscillating electric field. In particular, the coupling may include any one or more of the following three modes: (i) inductive mode, (ii) differential capacitive mode, and (iii) common capacitive mode.

While the receive-resonator 1042 resonates in response to the oscillating field, a rectifier 1048 or other power conversion circuit may convert power from the receive-resonator 1042 and subsequently deliver the power to a load 1060. While the load 1060 is incorporated into the receiver 1040 as illustrated in FIG. 10, some embodiments may include loads that are physically separate or otherwise apart from the receiver 1040.

As shown in FIG. 10, the transmitter 1020 includes a controller 1024. In an example embodiment, the controller 1024 may determine what coupling mode(s) to employ and may control various elements of the transmitter 1020 so as to establish and/or maintain wireless resonant coupling links according to the determined coupling mode(s). The controller 1024 may also determine the amount of power that is transferred via the respective coupling mode(s).

As also described above, higher efficiencies can be achieved by adjusting impedances (resistance and/or reactance) on the transmitting side and/or the receiving side, e.g., impedance matching. Accordingly, the transmitter 1020 may include an impedance matching network 1026 coupled to the transmit-resonator 1022. Similarly, the receiver 1040 may include an impedance matching network 1046 coupled to the receive-resonator 1042.

In an example embodiment, a plurality of devices and objects may be present within a local environment of the transmitter 1020. In such a scenario, the example system 1000 may be configured to distinguish legitimate receivers from illegitimate devices that are not intended recipients of power transfer. Without an ability to discriminate between possible recipients of power transfer, illegitimate devices may act as parasitic loads that may receive power from the transmitter without permission. Thus, prior to transferring power to the receiver 1040, the transmitter 1020 may carry out an authentication process to authenticate the receiver 1040. In an example embodiment, the authentication process may be facilitated via a wireless side-channel communication link 1004.

The transmitter 1020 may include a wireless communication interface 1028 and the receiver 1040 may include a corresponding wireless communication interface 1048. In such a scenario, the transmitter 1020 and the receiver 1040 may establish a side-channel communication link 1004 via a wireless communication technology. For instance, classic BLUETOOTH® or BLUETOOTH® LOW ENERGY (BLE) (2.4 to 2.485 GHz UHF) or WIFI™ (2.4 GHz UHF/5 GHz SHF) may be employed to provide secure communications between the transmitter 1020 and the receiver 1040. Other wireless communication protocols are possible and contemplated. As shown in FIG. 10, the side-channel link 1004 communicatively couples the transmitter 1020 and the receiver 1040 over a secondary channel that is separate from the resonant power transfer link 1002. In alternative embodiments, however, the transmitter 1020 and the receiver 1040 may employ the same channel to transfer power and communicate information as described herein, e.g., by modulating aspects of the power transfer to communicate the information.

In an example embodiment the transmitter 1020 can communicate with the receiver 1030 over the side-channel communication link 1004 to determine that the receiver 1040 is authorized or otherwise permitted to receive power. The receiver 1040 may be configured to provide any type of information and/or acknowledgement required by the transmitter 1020 to authenticate the receiver 1040. For instance, the receiver 1040 may transmit an authentication code, a message, or a key to the transmitter 1020. In such scenarios, a device without the ability to establish side-channel communications with the transmitter 1020 may not be identified as a legitimate device.

The receiver 1040 may also include a controller 1044. As such, the controllers 1024, 1044 can conduct communications via the side-channel link 1004 and process the information exchanged between the transmitter 1020 and the receiver 1040.

As described above, when power is transferred from the transmitter 1020 to the receiver 1040, power may be reflected back to the transmitter 1020 As FIG. 10 illustrates, the transmitter 1020 may include a bi-directional RF coupler 1030 to measure the reflected power as also described above. Using measurements from the bi-directional RF coupler 1030, an optimal efficiency for the power transfer link 1002 may be ascertained, and the impedance(s) on the transmitting and/or receiving sides can be adjusted via the impedance matching networks 1026, 1046 so as to optimize or otherwise modify power delivery efficiency.

The impedance associated with the receiver 1040 may be determined based on the reflected power detected by measurement devices in conjunction with the bi-directional RF coupler 1030. If a nominal impedance (e.g., a designed impedance) of the receiver 1040 is known, a difference between the nominal impedance and the calculated impedance based on the measurement of reflected power may indicate a presence of one or more parasitic loads. Such parasitic loads may include illegitimate receivers. Using the side-channel communication link 1004 established between the transmitter 1020 and the receiver 1040, the receiver 1040 may be operable to communicate its nominal impedance to the transmitter 1020. Thus, the calculation of impedance using the bi-directional RF coupler 1030 may enable the identification of parasitic loads as well as enable dynamic impedance matching as disclosed elsewhere herein. The impedance(s) of the transmitter 1020 and/or the receiver 1040 can be adjusted via the impedance matching networks 1026, 1046 to account for the parasitic loads.

As described herein, the transmitter 1020 may be operable to identify the existence of the legitimate receiver 1040 through authentication communications via the side-channel communication link 1004. Additionally or alternatively, the transmitter 1020 may be operable to distinguish the legitimate receiver 1040 from other legitimate or illegitimate devices by other methods. In particular, the transmitter 1020 may be operable to control the power transfer link 1002 and the communication over the side-channel communication link 1004 with the same receiver 1040.

The side-channel communication link 1004 may be employed to identify and authenticate the receiver 1040 and to establish and adjust aspects of the power transfer link 1002, particularly to account for parasitic loads. Specifically, the side-channel communication link 1004 and the power transfer link 1002 may enable a variety of authentication protocols so as to provide secure communications and power delivery. For example, the transmitter 1020 and receiver 1040 may be operable to conduct a password authentication protocol (PAP), a challenge-handshake authentication protocol (CHAP), multi-factor authentication, or another type of cryptographic protocol. In general, however, the transmitter 1020 and the receiver 1040 may employ the side-channel communication link 1004 to exchange any type of information to manage any aspect of the power transfer link 1002.

In an example embodiment, the system 1000 may help ensure the availability of the side-channel communication link 1004 by intermittently or continuously transmitting a certain amount of power via a predetermined wireless resonant coupling link configuration. This transmission 1006 can power the wireless communication interface 1048 and allow it to remain active even if other aspects of the receiver 1040 do not receive power. As such, the receiver 1040 may receive sufficient power to establish initial communications with the transmitter 1020. Thereafter, the receiver 1040 may establish the power transfer link 1002. For instance, the transmission 1006 may provide a low power, e.g., approximately 1 W. In such a scenario, the power distribution efficiency of the transmission 1006 is less of a concern at relatively low powers.

As described above, the controller 1024 may determine what coupling mode to employ in the example system 1000. The controller 1024 may select coupling mode(s) based on the identification of parasitic loads. For instance, the transmitter 1020 may deliver power to the receiver 1040 via a common capacitive mode during a first time period. However, subsequent to the first time period, the controller 1024 may detect a parasitic device that may also be coupled to the transmitter 1020 via common capacitive mode. Consequently, the controller 1024 may cause the transmitter 1020 and/or the receiver 1040 to a switch to differential capacitive mode and/or inductive mode.

C. Mobile Power-Delivery Systems

The wireless power system disclosed herein may be implemented to provide wireless power coverage to wireless power devices located in an area. The wireless power system may include one wireless power transmitters and a controller. The area in which the system may provide coverage may be an indoor area, such as a warehouse or a commercial building, or may be an outdoor area, such as a park. In some examples, the wireless power system may be implemented to provide wireless power coverage to a large outdoor area, such as a city block, a neighborhood, a city, a county, or generally an area of any size.

However, as wireless power devices become more ubiquitous, the wireless power system may be required to supply power to various types of wireless power devices. Different types of wireless power devices may have different characteristics (e.g., design, hardware, software) and/or different power requirements. For instance, some wireless power devices may be mobile and other devices may be stationary. In another instance, some devices may include energy storage (e.g., a battery). Such devices may be powered using the energy storage, and therefore do not need to be coupled to a wireless power transmitter at all times. On the other hand, some devices do not include energy storage, and therefore may need to be coupled to a wireless power transmitter in order to operate.

Furthermore, some wireless power devices may be located out of range of a fixed wireless power source. In some cases, it may be impractical or difficult to provide a fixed transmitter in a location where receivers operate or need to operate. Mobile wireless power devices further add to the complexity of providing wireless power to devices since it may be difficult to supply a mobile device with a constant power supply from a fixed wireless power source. Examples of wireless power devices that may be outside the range of fixed wireless power sources include field devices, such as mobile delivery/transportation vehicles, remote communication equipment, and clusters of devices in remote locations where fixed power sources are not available.

In accordance with example embodiments, a system for wireless power delivery can include a mobile node or device that is a hybrid transmitter/receiver (TX/RX or transceiver) configured to move, travel, or "commute" to remote receivers and deliver power wirelessly based on the techniques described herein. This is device is also referred to herein as a "mobile charger." Specifically, a mobile charger can include a transmitter component (TX) having functionality of a transmitter, a receiver (RX) component having functionality of a receiver, and an energy storage for storing power (e.g., a battery) to supply to receivers. The energy storage may also serve as a power supply for various functions of the mobile charger including, but not limited to, mobility (commuting), communications, control, and processing.

Figure 11:
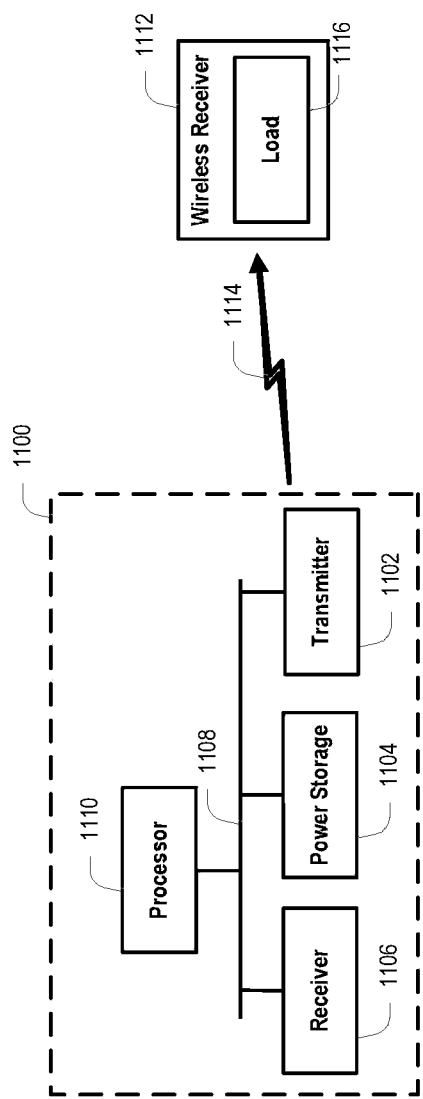
FIG. 11 illustrates block diagram of a mobile charger coupled to wireless receiver, according to an example embodiment.

FIG. 11 depicts a simplified block diagram of a mobile charger 1100, in accordance with an example embodiment. The mobile charger 1100 also includes a transmitter (Tx) 1102, an energy storage 1104, and a receiver (Rx) 1106. By way of example, the components are depicted as being connected by an interface 1108, which could support communication between components, as well as power supply and/or other operational aspects of the mobile charger 1100. Although not shown in FIG. 11, the mobile charger 1100 could include a payload for carrying out other tasks.

In an embodiment, the mobile charger 1100 may include a resonator that operates as the transmitter 1102 and the receiver 1106. In such an embodiment, the transmitter 1102 and the receiver 1106 may operate on the same resonant frequency. In another embodiment, the mobile charger 1100 may include separate transmitter and receiver resonators. In such an embodiment, the transmitter resonator and the receiver resonator may operate on different frequencies.

The mobile charger 1100 can be configured in various forms such as an autonomous unmanned vehicle operational to travel between one or more fixed transmitters and one or more specified locations that may be host to one or more remote receivers. In the location of the one or more remote receivers, the transmitter 1102 may function to wirelessly transfer power from the power store to the one or more remote receivers. In the location of the fixed transmitter, the receiver 1106 can be configured to receive power via wireless power transfer, and to use the received power to at least partially replenish (e.g., refill and/or recharge) the energy storage 1104.

By way of example, FIG. 11 also includes a representative wireless receiver 1112, including a receiver load 1116. Example operation, such as the operations described above, is illustrated conceptually by the motion arrow 1114 representing the wireless resonant coupling link between the mobile charger 1100 and the wireless receiver 1112. Specifically, the mobile charger 1100 may wirelessly deliver power to the wireless receiver 1112 via the wireless resonant coupling link 1114. The mobile charger 1100 also includes a processor 1110. A processor, such as the processor 1110 or any other processor discussed in this description, can comprise one or more general purpose processors (e.g., INTEL single core microprocessors or INTEL multicore microprocessors) or one or more special purpose processors (e.g., digital signal processors). It will be appreciated that the simplified block diagram of FIG. 11 and the simplified example operation description are intended for illustrative purposes.

Within examples, the mobile charger 1100 may include a high-density stored power source, such as liquid fuel or a fuel cell. This source may be separate from the replenishable energy storage 1104. A high-density stored power source can be used to power operations of the mobile charger 1100 and/or to provide power for wireless electrical power transfer to wireless receivers 1112.

In an example embodiment, the wireless power system may provide wireless power coverage to an area via fixed and/or mobile transmitters. In particular, the system may deploy the mobile charger 1100 in the area in order to provide wireless power coverage to wireless receivers that are not located within the range of fixed wireless power transmitters and/or to provide wireless power coverage to mobile receivers. In some examples, the system may rely exclusively on fixed or mobile transmitters to provide coverage to an area.

The system may determine to deploy the mobile charger 1100 in an area to provide wireless power coverage to that area. For example, the system may determine to deploy the mobile charger 1100 in an outdoor area. The system may specify the area in terms of GPS coordinates, geographic coordinate system coordinates, street names, city names, or other identifiers. The deployed mobile charger 1100 then travels within the specified area and establishes wireless resonant coupling links with wireless power receivers located within the specified area. The mobile charger 1100 may authenticate and authorize the wireless receivers, using methods described herein, before supplying the receivers with power, also using methods described herein.

The system may also determine a route for the mobile charger 1100 that is deployed or that is to be deployed. The route may indicate the geographical path along which the mobile charger 1100 may travel in the area. Within examples, the system may specify the route in terms of GPS coordinates, geographic coordinate system coordinates, navigation directions, cardinal directions, directions with respect to a grid or other coordinate system specific to the area, etc. The system may also provide the mobile charger 1100 with data indicative of features of the area. For instance, the data may be indicative of structural or environmental features of the area, such as a map or blueprint. The data may also be indicative of extraneous elements in the environment, such as obstacles, vehicles, or devices that may be located in the area. In some examples, the system may provide the mobile charger 1100 with control operations that cause the mobile charger 1100 to travel along the determined route.

The system may determine the route based on a location of wireless power receivers in the area. Specifically, the wireless power system may select a route that travels near areas where a large number of wireless receivers are located. By determining the route based on the location of the wireless receivers in the area, the system may increase the number of wireless receivers that receive wireless power coverage.

The location of the wireless receivers may be known to the system based on data that the system receives from the receivers. For example, a wireless receiver may be coupled to an electronic device that has Internet access. The electronic device may request power from the system via the Internet, and may provide identifying data, such as its location, to the system. Other methods of determining the location of wireless power receivers are possible. In an example, the system may determine the location of the receivers based on inputs from users (e.g., registering their electronic devices that are coupled to wireless receivers). In another example, the system may determine the location of wireless receivers based on third party data. For instance, the system may determine, based on third party traffic data, locations of traffic congested areas where vehicles with wireless receivers may be located.

Additionally and/or alternatively, the wireless power system may determine the route based on the location of wireless power charging stations disposed in the area. Wireless power charging stations may include a wireless power transmitter coupled to a power source. The mobile charger 1100 may couple to the wireless power transmitter, when located within a range of the transmitter, in order to receive power to recharge or replenish its energy storage 1104. Therefore, mapping the mobile charger 1100's route to pass near charging stations (also referred to as "charging zones") may allow the mobile charger 1100 to recharge its energy storage 1104. Allowing the mobile charger 1100 to recharge its energy storage 1104 while traveling along its route may increase the distance that the mobile charger 1100 can travel.

Additionally and/or alternatively, wireless power system may determine a route based on a price that receivers are willing to pay for power (e.g., cents per kW). For instance, the system may determine to plan the route near a receiver if the price that the receiver is willing to pay is greater than the cost of deploying the mobile charger 1100 to provide power to the receiver. That is, the system may determine to provide power to a receiver, and then may plan the route of the mobile charger 1100 such that the mobile charger 1100 provides power to the receiver, if the system determines that providing power to the receiver would generate a profit. A receiver may provide the system with the price that it is willing to pay when the receiver requests power from the system. In some examples, the receiver may negotiate with the system to determine a price to pay for power.

The wireless power system may also determine a schedule according to which the mobile charger 1100 travels along the route. In particular, the system may schedule the mobile charger 1100 to reach particular locations along the determined route at specific times. The system may factor extraneous conditions when scheduling the time at which the mobile charger 1100 arrives at a particular location. For example, the route of the mobile charger 1100's route may include traveling on a road. In such an example, the time at which the mobile charger 1100 may arrive at a location may depend on traffic congestion on the road, the road's speed limits, idle time at traffic lights, etc. The system may factor such extraneous conditions when determining the schedule.

Additionally and/or alternatively, the wireless power system may utilize computational optimization techniques to determine the route and/or to determine the schedule of the mobile charger 1100. In particular, the system may use various optimization techniques to generate a plurality of "model" routes in order determine an optimized route in terms of efficiency of operation of the mobile charger 1100, the number of receivers that will receive power as the mobile charger 1100 travels along a route, and/or efficiency of travel.

In an example, despite deploying the mobile charger 1100, the system may determine some wireless receivers are still outside the coverage area of the wireless power system. Additionally and/or alternatively, the system may determine that a threshold number of devices are coupled to the mobile charger 1100, and therefore, that the mobile charger 1100 may not adequately provide power to all of the wireless receivers. In response to the determination, the system may deploy a plurality of mobile chargers in the area in order to extend the coverage area of the wireless power system and/or to decrease the load on the mobile charger 1100. The system may also determine a respective route and schedule for each of each of the plurality of mobile chargers.

The wireless resonant coupling link may be established when the repeater couples with the transmitter or another repeater. The repeater may then emit the signal via a second wireless coupling link established with another repeater and/or a receiver. In some embodiments, the repeater may emit a signal such that the coverage area associated with the emitted signal is farther away from the transmitter than the coverage area of the transmitter.

Figure 12:
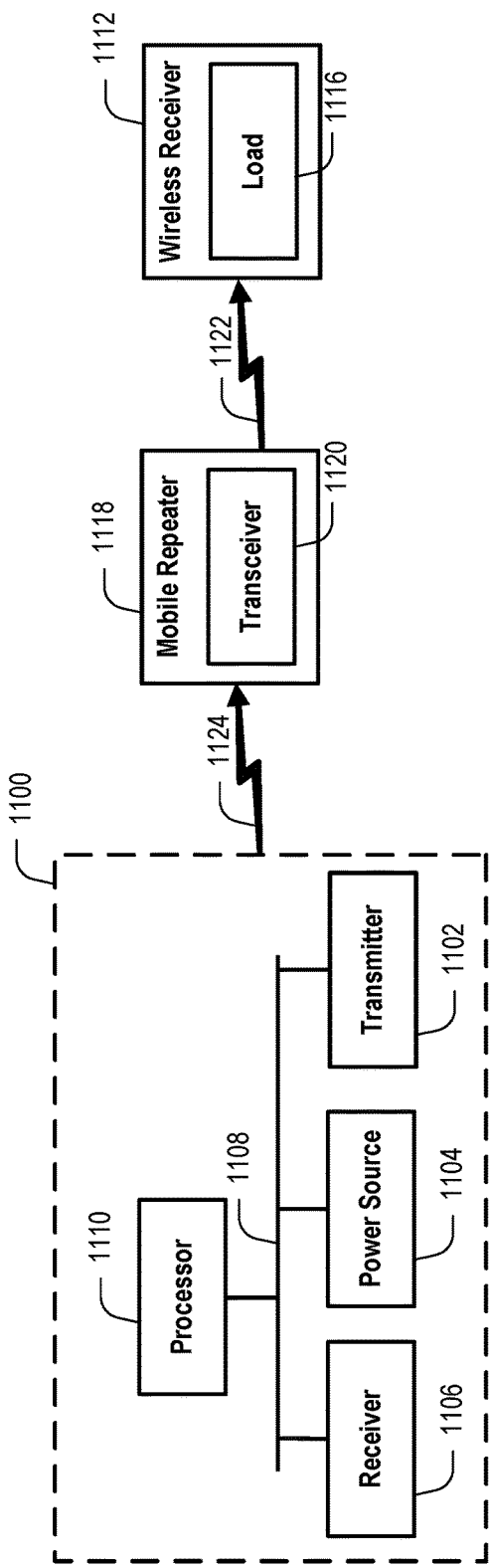
FIG. 12 illustrates block diagrams of the mobile charger, a mobile repeater, and the wireless receiver, according to an example embodiment.

FIG. 12 depicts a simplified block diagram of a mobile repeater 1118, in accordance with an example embodiment. The mobile repeater 1118 also includes a transceiver 1120. The mobile repeater 1118 can be configured in various forms such as an autonomous unmanned vehicle. Although not shown in FIG. 12, the mobile repeater 1118 could include a payload for carrying out other tasks.

In an embodiment, the mobile repeater 1118 may include a resonator that operates as a transmitter and a receiver. In such an embodiment, the transmitter and the receiver may operate on the same resonant frequency. In another embodiment, the mobile repeater 1118 may include separate transmitter and receiver resonators. In such an embodiment, the transmitter resonator and the receiver resonator may operate on different frequencies.

The mobile repeater 1118 may couple to the mobile charger 1100 via a wireless resonant coupling link 1124. The mobile repeater 1118 may receive power via the link 1124, which the mobile repeater 1118 may then use to generate a wireless power signal. The coverage area associated with the wireless power signal generated by the mobile repeater 1118 is farther away from the mobile charger 1100 than the coverage area associated with the power signal generated by the mobile charger 1100.

Furthermore, in this example, the wireless receiver 1112 is out of range of the coverage area of the mobile charger 1100 and may not be able to couple with the mobile charger 1100 in order to receive power. Instead, the wireless receiver 1112 may couple with the wireless power signal of the mobile repeater 1118 to establish a wireless resonant coupling link 1122 with the mobile repeater 1118. The mobile repeater 1118 may then supply the wireless receiver 1112 with power via the link 1122. It will be appreciated that the simplified block diagram of FIG. 12 and the simplified example operation description are intended for illustrative purposes.

In an embodiment, the mobile repeater 1118 may be a passive device, in the sense that it may be powered only by the power that it receives via its transceiver. Such a passive device may operate without an energy storage or with an energy storage that has a small capacity. Eliminating the energy storage from the mobile repeater 1118 may allow for a light-weight and more compact device than mobile repeaters that include large energy storage ("active repeaters"). Such a design may also decrease the cost of the passive the mobile repeater 1118. As such, due to the light-weight, compact, and relatively inexpensive design, the mobile repeater 1118 may be suitable to deploy in an area in order to extend the range of a mobile charger device.

In further accordance with example embodiments, the wireless power system may deploy one or more the mobile repeaters in an area to extend the range of the mobile charger 1100. The number of mobile repeaters that the system deploys in the area may depend on one or more factors. A factor the system may use to determine the number of mobile repeaters to deploy may be the location of the wireless receivers. In particular, the wireless receivers may be scattered throughout the area, and therefore some receivers may be located outside the coverage area of the mobile charger 1100. By determining the location of the receivers, the system may determine a desired size of the system's coverage area. The system may then determine a number of mobile repeaters to be deployed in the area in order to expand the system's coverage area to the desired size.

Another factor the system may use to determine the number of mobile repeaters to deploy may be the strength of the wireless power signal generated by the mobile charger 1100. The strength of the wireless power signal generated by the mobile charger 1100 may be affected by interference conditions. For example, if the mobile charger 1100 is deployed in an indoor area, the strength of the wireless power signal may be deteriorated by obstacles, such as walls. A deteriorated signal strength may affect the range of the coverage area of the mobile charger 1100. In an example, the system may detect the interference condition by detecting a deterioration in the strength of the wireless power signal generated by the mobile charger 1100. Responsive to the detection, the system may determine the number of mobile repeaters to deploy. For example, the system may determine the number of mobile repeaters based on an extent of deterioration in the strength of the wireless power signal.

Furthermore, the system may determine a respective route for each mobile repeater to be deployed. Within examples, the system may determine a route of a mobile repeater based on the route of the mobile charger 1100. In particular, the system may determine a route for the mobile repeater such that the mobile repeater travels in substantially the same direction as the mobile charger 1100. In an example, the system may determine a route for the mobile repeater that is identical to the route of the mobile charger 1100. In this example, the mobile repeater may travel along the same route as the mobile charger 1100, but the mobile repeater may maintain a certain distance from the mobile charger 1100 and/or a specific relative position with respect to the mobile charger 1100. This can be achieved by determining the same route for the mobile charger 1100 and the mobile repeater, and determining different schedules for each of the devices.

In another example, each mobile repeater may travel in substantially in the same direction as the mobile charger 1100 while maintaining a respective displacement, in distance and/or direction, from the mobile charger 1100. The system may determine the respective displacement for each mobile repeater based on one or more factors.

In an example, the system may determine the respective displacement of each mobile repeater from the mobile charger 1100 based on the desired coverage area of the system. As explained above, the desired coverage area of the system may depend on the location of the wireless receivers in the area. The system may determine a respective displacement from the mobile charger 1100 for each mobile repeater such that the collective coverage area of the mobile charger 1100 and the mobile repeaters is at least the desired coverage of the system.

However, there may be limits on the displacement of a mobile repeater with respect to the mobile charger 1100. As explained above, the coupling coefficient of a wireless resonant coupling link may depend on the distance between the two devices that are coupled via the link. In this embodiment, the distance between the mobile charger 1100 and a mobile repeater may affect the strength of the wireless resonant coupling link between the mobile charger and the mobile repeater. Therefore, the system may determine, for each mobile repeater, a respective "threshold distance" at which the strength of the coupling link between the mobile charger 1100 and the respective repeater is below a threshold. The threshold strength is the minimum signal strength that may be required for an efficient power transfer. Therefore, the system may determine that the respective threshold distance is the maximum distance from the mobile charger 1100 that each respective mobile repeater can be displaced. Note that the threshold distance may be based on various factors, such as environmental conditions and transceiver hardware characteristics. Therefore, the threshold distance may change as the components of the system change, and thus the system may periodically recalculate the threshold distance.

In many examples, a mobile repeater's displacement from the mobile charger 1100 may be affected by extraneous conditions such as traffic and/or other obstacles. Therefore, the respective distance of each mobile repeater from the mobile charger 1100 may be defined as displacement range. A repeater device substantially maintains a certain displacement from the mobile charger 1100 by maintaining a displacement that is within the determined respective displacement range of that repeater device.

In further accordance with example embodiments, the system may determine the routes of each of the plurality of mobile repeaters to operate the mobile repeaters in a particular configuration. For example, the system may determine the routes of each of the mobile repeaters such that the repeaters mimic swarming behavior. In another example, the mobile repeaters may be configured in a chain-like configuration, such that each subsequent mobile repeater in the chain resonantly repeats the near field of an earlier link in the mobile repeater chain. The plurality of mobile repeaters may also be configured in array-like or web-like configuration. In such scenarios, the coverage area of the mobile charger 1100 may be continually extended beyond its original range.

Accordingly, once the mobile repeaters are deployed, each mobile repeater may establish a wireless resonant coupling link with the mobile charger 1100 and/or with one or more mobile repeaters. Each of the mobile charger 1100 and the mobile repeaters may further establish respective wireless resonant coupling links with wireless receivers located within their respective coverage areas.

In some examples, a wireless receiver that is requesting power from the system may be located in a coverage area of one of the power devices (i.e., the mobile charger and the mobile repeaters). The system, upon receiving the request from the wireless receiver, may direct the receiver to establish a wireless resonant coupling link with the power device that is providing coverage to the area in which the receiver is located. In other examples, a receiver requesting power may be located in a location within the coverage area of more than one power device. In such an example, the system may select a power device to which the receiver may couple. In order to select the power device, the system may first estimate a respective strength of a hypothetical wireless resonant coupling link between the receiver and each of the power devices. Then, the system may select the power device that has the strongest hypothetical link with the receiver. The selected power device may then establish a wireless resonant coupling link with the receiver in order to supply the receiver with power.

Within examples, the system may also coordinate handover of wireless receivers between the mobile charger 1100 and the mobile repeaters. Handover of wireless receivers may occur when the system detects that the coupling strength between a receiver and a first power device to which it is coupled is deteriorating, and that a stronger signal (generated by a second power device) is available for the receiver to couple to. The deterioration in signal strength may be due to interference conditions and/or an increasing displacement between the receiver and the first power device. In such conditions, the system may determine to handover the wireless receiver from the first power device to the second power device. Handover of wireless receivers may allow the system to supply receivers with a constant power supply even as the receivers and/or the power devices move.

Furthermore, the wireless power system is a dynamic system that may continuously or periodically adjust its operations based on the status of the system, sensor data, feedback data, third party data, and/or extraneous conditions. For example, the route and schedule of the mobile charger 1100 may periodically be adjusted based on data indicative of changes in the status of the area in which the mobile charger 1100 is deployed. For instance, the route of the mobile charger 1100 may be adjusted in response to detecting that extraneous conditions along the current route may cause delay in the mobile charger 1100's schedule. Other examples of adjustments that the system may perform include dynamically adjusting the number of mobile chargers that are deployed, the number of mobile repeaters that are deployed, the route of a mobile repeater, adjusting the desired system coverage area, etc.

The wireless power system may also provide instructions to other systems that may be operating in the vicinity of the wireless power system. The instructions may cause the other systems to adjust one or more of their operations in order to improve the functionality of the wireless power system. For example, consider a wireless power system that is implemented in an automated warehouse. The automated warehouse may include autonomous vehicles that operate in the warehouse. In this example, the wireless power system may provide the automated warehouse's control system with data indicative of the route and schedule of the mobile charger 1100. The automated warehouse may adjust the route of its autonomous vehicles based on the route of the mobile charger 1100 such that the autonomous vehicles do not cause any delay in the mobile charger 1100's schedule. Other examples of adjustments that systems may perform based on the status of the wireless power system are also possible.

An example implementation of the wireless power system described above is the implementation of the wireless power system as a rapid transit system. A rapid transit system is a transit system that meets specific design and operational requirements, such as right of way for certain vehicles and certain scheduling requirements. The rapid transit system may include different types of vehicles, such as buses, trains, trams, etc. These vehicles may be deployed in an area (e.g., city, county, etc.) to provide public transportation to individuals living or working in the area. Furthermore, each of these vehicles may travel along a predetermined route according to a schedule. As further explained below, the transit vehicle may be a vehicle with any desired system or engine (e.g., fossil fuels, gasoline, diesel, or battery), a manned or unmanned vehicle, and/or an autonomous or semiautonomous vehicle.

In an example embodiment, a transit vehicle that is deployed in an area may operate as a mobile charger (e.g., mobile charger 1100) of the rapid transit system. Specifically, the transit vehicle may be equipped with a transmitter, a receiver, and an energy storage device. As explained above, the transmitter may transmit power from the energy storage to wireless power receivers located in the range of the transmitter. For example, electric or hybrid vehicles on the road may include a wireless power receiver that may be configured to couple to the transmitter in order to wirelessly receive power to charge their batteries. Other examples of receivers that may couple to a transit vehicle to receive power include portable devices of commuters, traffic lights, road signs, road lights, etc.

In an embodiment, the transit vehicle that is operated as a mobile charger may be a commuter bus. A commuter bus that operates as a mobile charger is also referred to herein as a charger bus. In some examples, the charger bus may have a predetermined route as part of the transit system in the city. In other examples, the rapid transit system may determine a route for the charger bus, using the methods described herein. In yet other examples, the rapid transit system may modify the charger bus's predetermined route to create a new route.

The charger bus may be scheduled to make stops along its determined route. For example, the charger bus may be scheduled to make periodic stops at bus stops, bus stations, transit stations, etc. Such periodic stops may provide opportunities for passengers to board or disembark from the bus. In an example, the rapid transit system may include a wireless power source at the locations where the charger bus is scheduled to make stops. As such, the charger bus, when stopping at a stop location, may couple to the wireless power source in order to recharge its power source. In an example, the wireless power source may be a high voltage power source such that the charger bus may rapidly charge its energy storage when stopping at the stopping location. In an alternative embodiment, the high-voltage power source may be a contact charging source.

The rapid transit system may also include one or more mobile repeaters that may be deployed in order to extend the range of the charger bus. The mobile repeater may be an autonomous vehicle, such as an autonomous car or an unmanned aerial vehicle. As described above, the wireless power system may determine a respective route for each of the repeater vehicles. Once the repeater vehicles are deployed, they may couple to the charger bus in order to extend the range of the charger bus. Subsequently, receivers in the range of the repeater vehicles may couple to one of the repeater vehicles, using the methods described herein.

Figure 13:
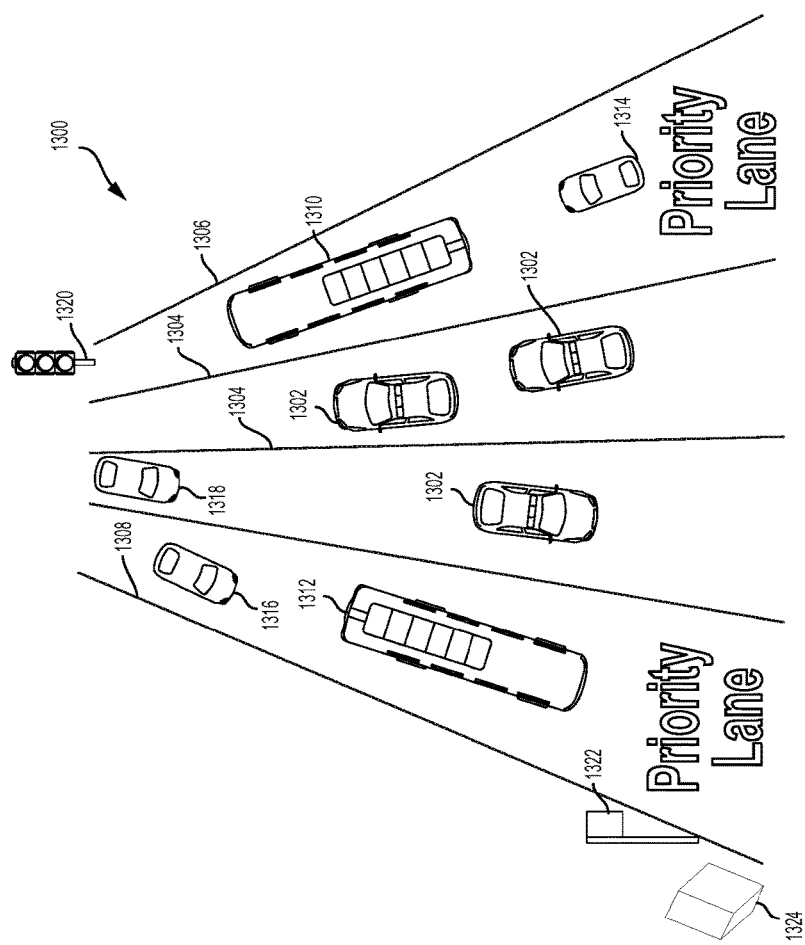
FIG. 13 illustrates an implementation of a wireless power system, according to an example embodiment.

FIG. 13 illustrates a scenario 1300 where a rapid transit system operates as a wireless power system, according to an example embodiment. The rapid transit system may include charger vehicles 1310, 1312, and repeater vehicles 1314, 1316, 1318. As illustrated in FIG. 13, the charger vehicles and the repeater vehicles may be deployed to travel on a road. In an example, the route of the charger vehicles 1310, 1312 may almost exclusively be on priority lanes 1306, 1308. In other examples, the route of the charger vehicles 1310, 1312 may include other lanes as well. Similarly, in some examples, the route of the repeater vehicles may almost exclusively be on priority lanes, and in other examples, the route of the repeater vehicles may be on other lanes. Whether the route of the charger vehicles and the repeater vehicles exclusively includes priority lanes may depend on the status of traffic in the area in which the vehicles are deployed. If there is heavy traffic, the system may adjust the routes such that the vehicles travel solely on priority lanes. Conversely, if traffic is light, the system may adjust the routes such that the vehicles travel on other lanes.

As also illustrated in FIG. 13, the charger vehicle 1310 may be heading towards an intersection where traffic light 1320 is located. The rapid transit system may cause the traffic light 1320 to change its status based on the location of the charger vehicle 1310. For example, the rapid transit system may estimate a time at which the charger vehicle 1310 may arrive at the intersection. The rapid transit system may then cause, at the estimated time of arrival, the traffic light 1320 to indicate right-of-way for the charger vehicle 1310.

FIG. 13 also illustrates a bus stop 1322 where the charger bus 1312 is scheduled to stop as it travels along its route. As also illustrated in FIG. 13, there is a power source 1324 located near the bus stop 1322. The power source 1324 may be configured to provide wireless power to commuters waiting for the charger bus 1312 to arrive. Furthermore, the power source 1324 may also provide power to the charger bus 1312 once the charger bus 1312 is within the coverage area of the power source 1324.

Furthermore, the rapid transit system may provide instructions to other systems and devices that are located in an area. For example, in the scenario 1300, a control system may operate the traffic lights, assign lane priority to vehicles, set the speed limit in the area, control electronic displays near the road, etc. In an example, the rapid transit system may provide instructions to the control system based on the status of the rapid transit system. For example, as explained above, the rapid transit system may provide instructions to the traffic light to display a specific indicator at a specific time. The rapid transit system may also set the speed limit in the area. As an example, if the charger bus 1310 is behind schedule, the rapid transit system may temporarily increase the speed limit for the charger bus 1310. The rapid transit system may also determine lane priority based on the location of the charger vehicles and/or the repeater vehicles. For example, as illustrated in FIG. 13, under some conditions and/or times of day, only the charger buses and the repeater vehicles may be permitted to travel within the priority lanes 1306 and 1308.

The wireless power system may be implemented as or integrated with a variety of other systems. For example, the wireless power system may be implemented as an automated warehouse system. In this example, the mobile charger may be implemented as warehouse vehicle, such as an autonomous forklift. The wireless power system may also be implemented as a short or long-haul delivery system where delivery trucks operate as mobile chargers. That is, the delivery trucks may include a determined route and schedule with designated stops to pick up and/or drop off cargo. In such a scenario, the delivery trucks may provide wireless power to mobile receivers while the delivery truck travels along its scheduled route. Other examples are also possible.

Furthermore, a mobile charger and/or a mobile repeater may take the form of various types of vehicles including unmanned and manned vehicles. An autonomous unmanned vehicle can take on a variety of forms and modes of mobility. Non-limiting examples include an unmanned aerial vehicle (UAV), unmanned space vehicles (USVs), an unmanned ground vehicle (UGV), and an unmanned marine vehicle (UMV). A non-limiting example of a UAV is a multi-copter configured for aerial flight between locations and hovering at individual locations. A non-limiting example of a UGV is a robotic wheeled vehicle configured for driving between locations and "parking" at individual locations. A non-limiting example of a UMV is a robotic surface boat configured for traveling over the surface of a body of water (e.g., ocean, lake, river, etc.) between locations and floating on the surface at individual locations. A UMV could also be a robotic submarine vehicle. In some examples, the autonomous unmanned vehicle may not necessarily park or hover at a location, but rather just "drive by" the location, possibly at a reduced speed compared to the speed of travel to or between locations. Therefore, although the embodiments herein describe a vehicle rapid transit system, the rapid transit system may include UAVs, UMVs, and/or USVs. Furthermore, the rapid transit system may be an aerial and/or marine rapid transit system. Other examples are also possible.

Further, an autonomous unmanned vehicle can be fully autonomous or semiautonomous. A fully autonomous vehicle may be configured for operation without human assistance or intervention, except possibly for human actions in loading or installing instructions prior to operation, for example. A partially autonomous vehicle may be configured for operation with some degree of human assistance or intervention, such as remote or local control of at least some of the vehicle's operations. Unless otherwise specified or apparent from context, the term "autonomous unmanned vehicle" shall be taken herein to refer to both fully and partially autonomous unmanned vehicles.

Figure 14:
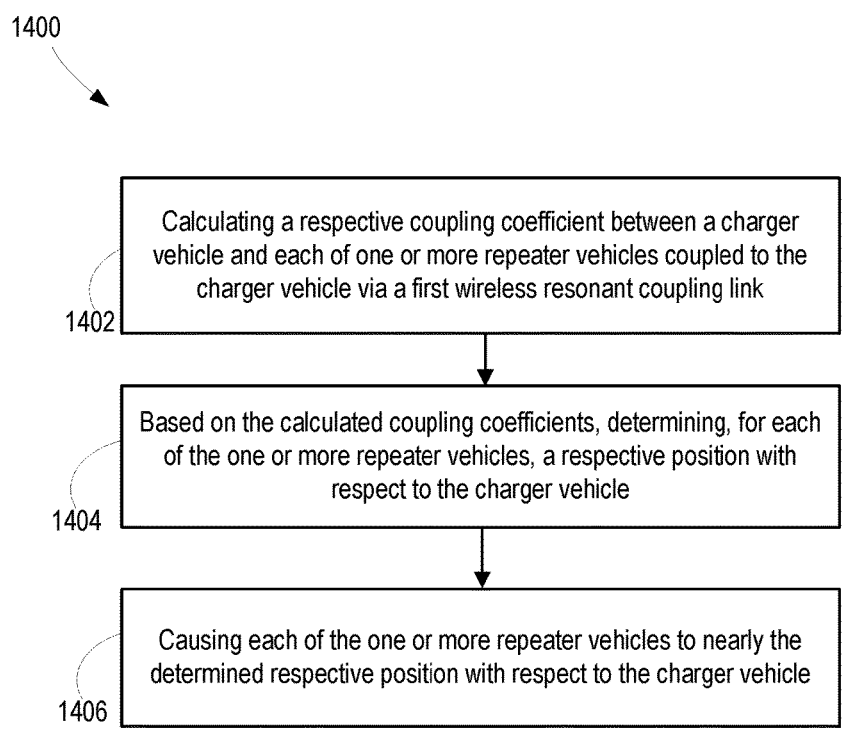
FIG. 14 is a flowchart of a method, according to exemplary embodiment.
Figure 15:
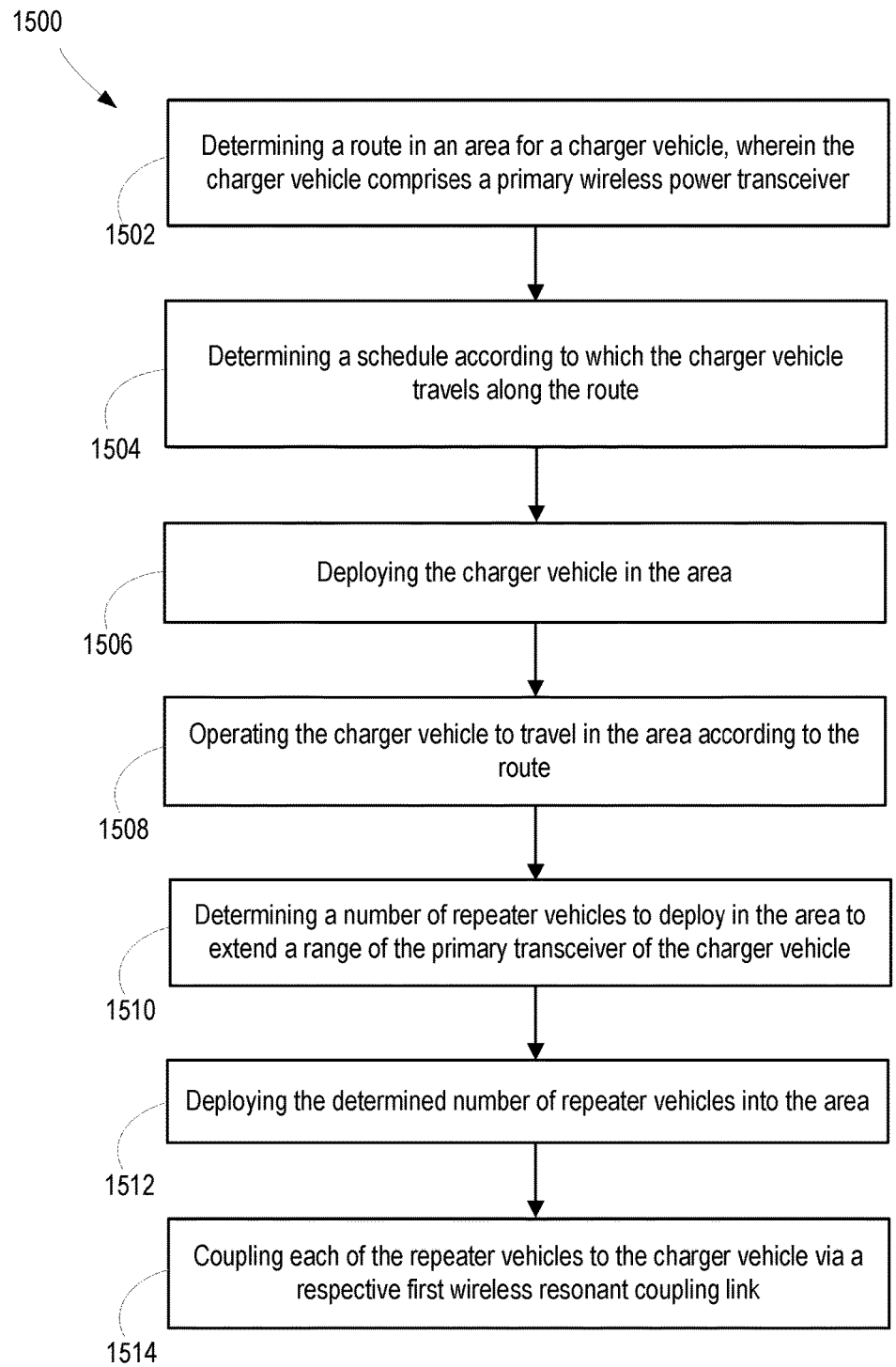
FIG. 15 is a flowchart of another method, according to an example embodiment.

FIGS. 14 and 15 illustrate methods 1400 and 1500 respectively, according to an exemplary embodiment. As noted above, the functionality described in connection with the flowcharts described herein can be implemented as special-function and/or configured general-function hardware modules, portions of program code executed by one or more processors for achieving specific logical functions, determinations, and/or steps described in connection with the flowchart shown in FIG. 14. Where used, the program code can be stored on any type of non-transitory computer-readable medium, for example, such as a storage device including a disk or hard drive.

In addition, each block of the flowchart shown in FIGS. 14 and 15 may represent circuitry that is wired to perform the specific logical functions in the process. Unless specifically indicated, functions in the flowchart shown in FIGS. 14 and 15 may be executed out of order from that shown or discussed, including substantially concurrent execution of separately described functions, or even in reverse order in some examples, depending on the functionality involved, so long as the overall functionality of the described method is maintained.

As shown by block 1402 in FIG. 14, the method 1400 involves calculating a respective coupling coefficient between a charger vehicle and each of one or more repeater vehicles coupled to the charger vehicle via a first wireless resonant coupling link. As explained above, the charger vehicle includes a primary wireless power transceiver, and the charger vehicle travels in the area based on a route and a schedule, and each of the one or more repeater vehicles includes a respective secondary wireless power transceiver.

As shown by block 1404 in FIG. 14, the method 1400 further involves based on the calculated coupling coefficients, determining, for each of the one or more repeater vehicles, a respective position with respect to the charger vehicle.

As shown by block 1406, the method 1400 further involves causing each of the one or more repeater vehicles to nearly the determined respective position with respect to the charger vehicle.

As shown by block 1502 in FIG. 15, the method 1500 involves determining a route in an area for a charger vehicle, where the charger vehicle includes a primary wireless power transceiver. As shown by block 1504, the method 1500 also involves determining a schedule according to which the charger vehicle travels along the route. As shown by block 1506, the method 1500 further involves deploying the charger vehicle in the area. As shown by block 1508, the method 1500 further involves operating the charger vehicle to travel in the area according to the route. As shown by block 1510, the method 1500 further involves determining a number of repeater vehicles to deploy in the area to extend a range of the primary transceiver of the charger vehicle. Yet further, as shown by block 1512, the method 1500 involves deploying the determined number of repeater vehicles into the area. As shown by block 1514, the method 1500 also involves coupling each of the repeater vehicles to the charger vehicle via a respective first wireless resonant coupling link.

It should be understood that methods 1400 and 1500 are described herein for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

III. CONCLUSION

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

The invention claimed is:

1. A system comprising:
one or more charger vehicles, each charger vehicle comprising:
an energy storage device;
a primary wireless power transceiver, wherein the primary wireless power transceiver is configured to transmit power from the energy storage device to authorized wireless power receivers located within a range of the primary wireless power transceiver;
a controller configured to:
determine a route in an area for the charger vehicle;
determine a schedule according to which the charger vehicle travels along the route;
deploy the charger vehicle in the area, wherein the charger vehicle is configured to travel along the route;
as the charger vehicle travels along the route, cause the primary wireless power transceiver to couple with one or more authorized wireless receivers located within the range of the primary wireless power transceiver, wherein the primary wireless power transceiver couples to the one or more authorized wireless receivers by establishing a respective first wireless resonant coupling link with each of the one or more authorized wireless receivers; and
cause the primary wireless power transceiver to transmit power to at least one of the authorized wireless receivers via the respective first wireless resonant coupling link, and
one or more repeater vehicles, wherein each repeater vehicle comprises a secondary wireless power transceiver configured to regenerate a wireless resonant signal, and wherein the controller is further configured to:
receive information indicative of an interference condition that affects the range of the primary wireless power transceiver; and determine, based on the received information, a number of repeater vehicles to deploy into the area so as to extend the range of the primary transceiver of the charger vehicle;

deploy the determined number of repeater vehicles into the area; and cause each repeater vehicle to couple to the charger vehicle via a respective second wireless resonant coupling link.

2. The system of claim 1, wherein the controller is configured to determine the route in the area based on a location of the one or more authorized wireless receivers in the area.

3. The system of claim 1, wherein the controller is configured to determine the route in the area based on a respective price per unit of power that each of the one or more authorized wireless receivers in the area is willing to pay.

4. The system of claim 1, wherein the controller is further configured to:

determine, based on a location of the one or more authorized wireless receivers in the area, a number of repeater vehicles to deploy into the area so as to extend the range of the primary transceiver of the charger vehicle;

deploy the determined number of repeater vehicles into the area; and cause each repeater vehicle to couple to the charger vehicle via a respective second wireless resonant coupling link.

5. The system of claim 4, wherein the controller is further configured to:

select at least one receiver of the one or more authorized wireless receivers coupled to the charging vehicle; and facilitate a handover of the at least one receiver from the charging vehicle to a respective repeater vehicle.

6. The system of claim 5, wherein the controller configured to select at least one receiver comprises the controller configured to:

determine a respective strength of each of the first wireless resonant coupling links; and determine that the respective strength of the respective first wireless coupling link of the at least one receiver is below a threshold.

7. The system of claim 5, wherein the controller is further configured to:

select a first receiver of the at least one receiver coupled to the respective repeater vehicle; and facilitate a handover of the first receiver from the respective repeater vehicle to the charger vehicle.

8. The system of claim 4, wherein the controller is further configured to:

detect a new authorized wireless receiver;

determine a location of the new authorized wireless receiver;

based on the location of the new authorized wireless receiver, estimate a respective strength of a respective hypothetical wireless resonant coupling link between the new authorized wireless receiver and each one of: the charging vehicle and each one of the repeater vehicles;

based on the estimated respective strength of each of the respective hypothetical wireless resonant coupling links, select a vehicle from one of: the charging vehicle and or one of the repeater vehicles; and cause the new authorized wireless receiver to couple with the selected vehicle by establishing a third wireless resonant coupling link with the selected vehicle.

9. The system of claim 4, wherein the controller is configured to:

determine a strength of each respective second wireless resonant coupling link between the charger vehicle and each of the repeater vehicles;

based on the strength of each respective second wireless resonant coupling link, determine, for each of the repeater vehicles, a respective position with respect to the charger vehicle; and cause each of the one or more repeater vehicles to substantially maintain the determined respective position with respect to the charger vehicle.

10. The system of claim 1, wherein the system is a rapid transit system providing public transit in the area, and wherein the charger vehicle is a commuter bus vehicle.

11. The system of claim 1, wherein one or more traffic signals are disposed in the area, and wherein the controller is further configured to:

estimate, based on a location of the charger vehicle with respect to a first traffic signal, a time at which the charger vehicle will be a threshold distance away from the first traffic signal; and at the estimated time, cause the first traffic signal to indicate right-of-way for the charger vehicle.

12. The system of claim 1, wherein the route comprises one or more stops at stop locations along the route, wherein a charging zone is located near at least one of the stop locations, and wherein the controller is configured to:

determine that the charger vehicle is within a range of a charging zone;

determine that the charger vehicle is coupled to a power source disposed within the charging zone; and cause the charger vehicle to receive electrical energy from the power source; and route the received electrical energy to the electrical storage device to charge the electrical storage device.

13. A method of controlling vehicles deployed in an area, the method comprising:

calculating a respective coupling coefficient corresponding to a threshold coupling strength between a charger vehicle and each of one or more repeater vehicles coupled to the charger vehicle via a first wireless resonant coupling link, wherein the charger vehicle comprises a primary wireless power transceiver, wherein the charger vehicle travels in the area based on a route and a schedule, and wherein each of the one or more repeater vehicles comprises a respective secondary wireless power transceiver;

based on the calculated coupling coefficients, determining, for each of the one or more repeater vehicles, a respective threshold distance from the charger vehicle corresponding to the threshold coupling strength; and causing the one or more repeater vehicles to travel on respective routes that keep each of the one or more repeater vehicles no greater than the determined respective threshold distance from the charger vehicle.

14. The method of claim 13, further comprising:

detecting an authorized wireless receiver;

determining a location of the authorized wireless receiver;

based on the location of the authorized wireless receiver, estimating a respective strength of a hypothetical wireless resonant coupling link between the authorized wireless receiver and each one of: the charging vehicle and each one of the repeater vehicles;

based on the estimated strength of the hypothetical wireless resonant coupling links, selecting a vehicle from one of: the charger vehicle or one of the repeater vehicles; and coupling the authorized wireless receiver with the selected vehicle by establishing a second wireless resonant coupling link with the selected vehicle.

15. The method of claim 13, wherein the charger vehicle is a commuter bus of a rapid transit system, wherein one or more traffic light signals are disposed in the area, and wherein the method further comprises:

estimating, based on a location of the charger vehicle with respect to a first traffic signal, a time at which the charger vehicle will be a threshold distance away from the first traffic signal; and at the estimated time, causing the first traffic signal to indicate right-of-way for the charger vehicle.

16. The method of claim 13, wherein the route comprises one or more stops at stop areas along the route, wherein a charging zone is located near at least one of the stop areas, and wherein the method further comprises:

determining that the charger vehicle is within a range of a charging zone;

establishing a second wireless coupling link between the charger vehicle and a wireless power source disposed within the charging zone; and receiving electrical energy, via the second wireless coupling link, from the wireless power source; and charging the electrical storage device with the received electrical energy.

17. A method comprising:

determining a route in an area for a charger vehicle, wherein the charger vehicle comprises a primary wireless power transceiver, wherein the charger vehicle is a transit vehicle of a rapid transit system, and wherein the charger vehicle is configured to travel on a priority traffic lane in the area;

determining a schedule according to which the charger vehicle travels along the route;

deploying the charger vehicle in the area;

operating the charger vehicle to travel in the area according to the route;

determining a number of repeater vehicles to deploy in the area to extend a range of the primary transceiver of the charger vehicle, based on a number of vehicles traveling in proximity of the transit vehicle;

deploying the determined number of repeater vehicles into the area; and coupling each of the repeater vehicles to the charger vehicle via a respective first wireless resonant coupling link.

18. The method of claim 17, further comprising:

calculating a respective coupling coefficient corresponding to a threshold coupling strength between the charger vehicle and each of the one or more repeater vehicles;

based on the calculated coupling coefficients, determining, for each of the one or more repeater vehicles, a respective threshold distance from the charger vehicle corresponding to the threshold coupling strength; and causing each of the one or more repeater vehicles to maintain a respective position that is no greater than the determined threshold distance from the charger vehicle.

* * * * *